US012328758B2

United States Patent
Li et al.

(10) Patent No.: US 12,328,758 B2
(45) Date of Patent: Jun. 10, 2025

(54) RESOURCE ALLOCATION FOR CHANNEL OCCUPANCY TIME SHARING IN SIDELINK COMMUNICATION

(71) Applicant: QUALCOMM Incorporated, San Diego, CA (US)

(72) Inventors: Qing Li, Princeton Junction, NJ (US); Hong Cheng, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 485 days.

(21) Appl. No.: 17/660,482

(22) Filed: Apr. 25, 2022

(65) Prior Publication Data
US 2023/0345527 A1 Oct. 26, 2023

(51) Int. Cl.
*H04W 74/0808* (2024.01)
*H04W 72/23* (2023.01)

(52) U.S. Cl.
CPC ....... *H04W 74/0808* (2013.01); *H04W 72/23* (2023.01)

(58) Field of Classification Search
CPC ................ H04W 74/0808; H04W 72/23
See application file for complete search history.

(56) References Cited

U.S. PATENT DOCUMENTS

| 2021/0092783 A1* | 3/2021 | Sun ................ H04W 76/15 |
| 2021/0195637 A1 | 6/2021 | Xue et al. |
| 2021/0400732 A1 | 12/2021 | Xue et al. |

FOREIGN PATENT DOCUMENTS

WO 2021212265 A1 10/2021

OTHER PUBLICATIONS

International Search Report and Written Opinion—PCT/US2023/016035—ISA/EPO—Jul. 10, 2023.

* cited by examiner

*Primary Examiner* — Elton Williams
(74) *Attorney, Agent, or Firm* — Haynes and Boone LLP

(57) ABSTRACT

Wireless communications systems, apparatuses, and methods are provided. A method of wireless communication performed by a first user equipment (UE) may include transmitting, to a network unit, an indication associated with channel occupancy time (COT) sharing on sidelink communication, receiving, from the network unit, a COT indicator, wherein the COT indicator indicates to the first UE to initiate a COT on sidelink communication based on the indication associated with the COT sharing or the COT indicator indicates to the first UE to share the COT on sidelink communication based on the indication associated with the COT sharing on sidelink communication, and transmitting, to a second UE, a communication during the COT on sidelink communication.

26 Claims, 10 Drawing Sheets

RESOURCE ALLOCATION FOR CHANNEL OCCUPANCY TIME SHARING IN SIDELINK COMMUNICATION

TECHNICAL FIELD

This application relates to wireless communication systems, and more particularly, to resource allocation for channel occupancy time (COT) sharing in sidelink communication.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed frequency bands and/or unlicensed frequency bands (e.g., shared frequency bands).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a first user equipment (UE) may include transmitting, to a network unit, an indication associated with channel occupancy time (COT) sharing on sidelink communication; receiving, from the network unit, a COT indicator, wherein the COT indicator indicates to the first UE to initiate a COT on sidelink communication based on the indication associated with the COT sharing or the COT indicator indicates to the first UE to share the COT on sidelink communication based on the indication associated with the COT sharing on sidelink communication; and transmitting, to a second UE, a communication during the COT on sidelink communication.

In an additional aspect of the disclosure, a method of wireless communication performed by a network unit may include receiving, from a first user equipment (UE), a first indication associated with channel occupancy time (COT) sharing on sidelink communication; receiving, from a second UE, a second indication associated with the COT sharing on sidelink communication; transmitting, to the first UE based on the first indication and the second indication, an indicator to initiate the COT on sidelink communication; and transmitting, to the second UE based on the first indication and the second indication, an indicator to share the COT on sidelink communication.

In an additional aspect of the disclosure, a first user equipment (UE) may include a memory; a transceiver; and at least one processor coupled to the memory and the transceiver, wherein the first UE is configured to transmit, to a network unit, an indication associated with channel occupancy time (COT) sharing on sidelink communication; receive, from the network unit, a COT indicator, wherein the COT indicator indicates to the first UE to initiate a COT on sidelink communication based on the indication associated with the COT sharing or the COT indicator indicates to the first UE to share the COT on sidelink communication based on the indication associated with the COT sharing on sidelink communication; and transmit, to a second UE, a communication during the COT on sidelink communication.

In an additional aspect of the disclosure, a network unit may include a memory; a transceiver; and at least one processor coupled to the memory and the transceiver, wherein the network unit is configured to receive, from a first user equipment (UE), a first indication associated with channel occupancy time (COT) sharing on sidelink communication; receive, from a second UE, a second indication associated with the COT sharing on sidelink communication; transmit, to the first UE based on the first indication and the second indication, an indicator to initiate the COT on sidelink communication; and transmit, to the second UE based on the first indication and the second indication, an indicator to share the COT on sidelink communication.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

DETAILED DESCRIPTION

Figure 1:
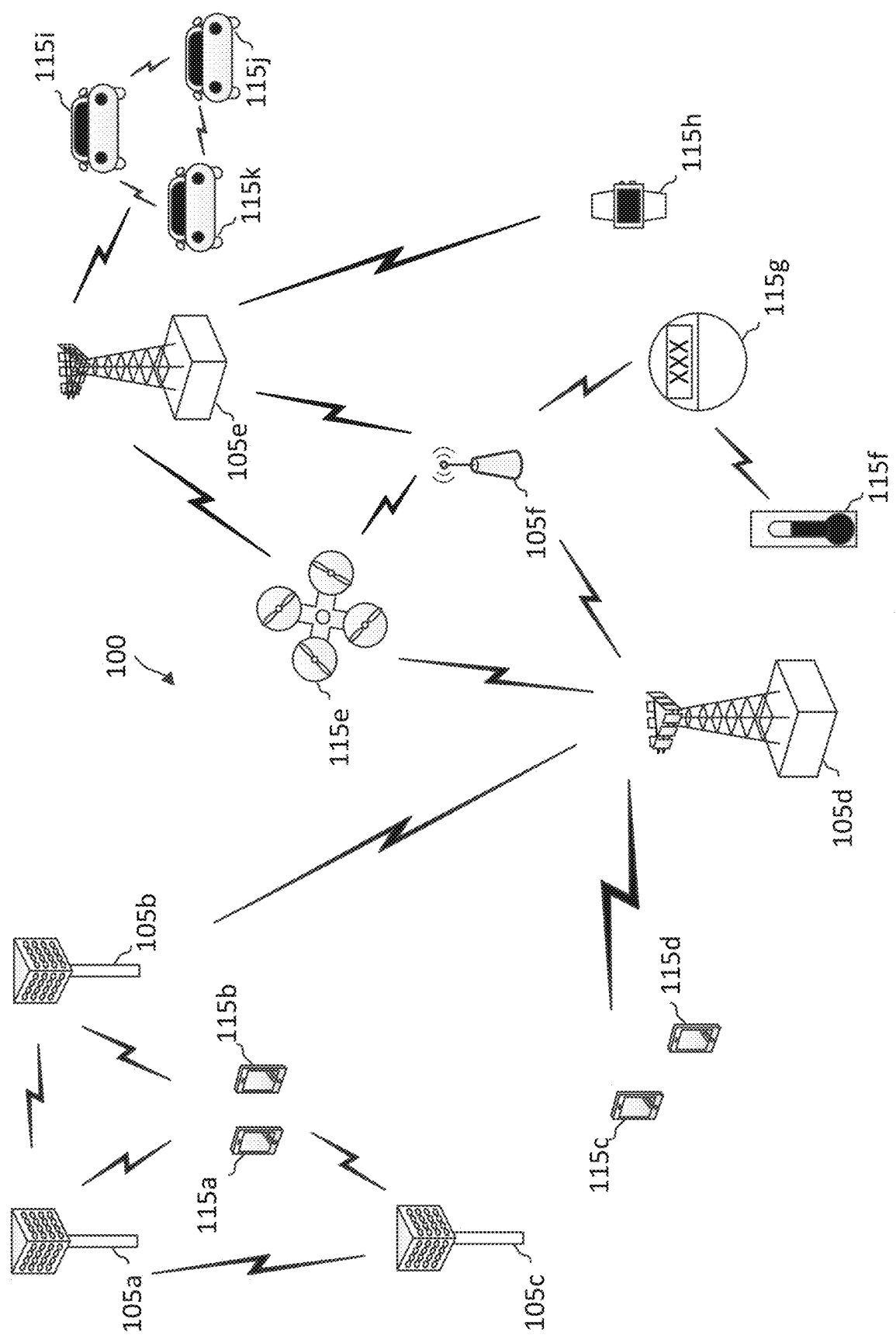
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The deployment of NR over an unlicensed spectrum is referred to as NR-unlicensed (NR-U). Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. Additionally, NR-U can also be deployed over 2.4 GHz unlicensed bands, which are currently shared by various radio access technologies (RATs), such as IEEE 802.11 wireless local area network (WLAN) or WiFi and/or license assisted access (LAA). Sidelink communications may benefit from utilizing the additional bandwidth available in an unlicensed spectrum. However, channel access in a certain unlicensed spectrum may be regulated by authorities. For instance, some unlicensed bands may impose restrictions on the power spectral density (PSD) and/or minimum occupied channel bandwidth (OCB) for transmissions in the unlicensed bands. For example, the unlicensed national information infrastructure (UNIT) radio band has a minimum OCB requirement of about at least 70 percent (%).

Some sidelink systems may operate over a 20 MHz bandwidth, e.g., for listen before talk (LBT) based channel accessing, in an unlicensed band. A BS may configure a sidelink resource pool over one or multiple 20 MHz LBT sub-bands for sidelink communications. A sidelink resource pool is typically allocated with multiple frequency subchannels within a sidelink band width part (SL-BWP) and a sidelink UE may select a sidelink resource (e.g., one or multiple subchannels in frequency and one or multiple slots in time) from the sidelink resource pool for sidelink communication.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a vehicle (e.g., a car, a truck, a bus, an autonomous vehicle, an aircraft, a boat, etc.). Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. In some aspects, the UE 115*h* may harvest energy from an ambient environment associated with the UE 115*h*. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115*i*, 115*j*, or 115*k* and other UEs 115, and/or vehicle-to-infrastructure (V21) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

The network 100 may be designed to enable a wide range of use cases. While in some examples a network 100 may utilize monolithic base stations, there are a number of other architectures which may be used to perform aspects of the present disclosure. For example, a BS 105 may be separated into a remote radio head (RRH) and baseband unit (BBU). BBUs may be centralized into a BBU pool and connected to RRHs through low-latency and high-bandwidth transport links, such as optical transport links. BBU pools may be cloud-based resources. In some aspects, baseband processing is performed on virtualized servers running in data centers rather than being co-located with a BS 105. In another example, based station functionality may be split between a remote unit (RU), distributed unit (DU), and a central unit (CU). An RU generally performs low physical layer functions while a DU performs higher layer functions, which may include higher physical layer functions. A CU performs the higher RAN functions, such as radio resource control (RRC).

For simplicity of discussion, the present disclosure refers to methods of the present disclosure being performed by base stations, or more generally network entities, while the functionality may be performed by a variety of architectures other than a monolithic base station. In addition to disaggregated base stations, aspects of the present disclosure may also be performed by a centralized unit (CU), a distributed unit (DU), a radio unit (RU), a Near-Real Time (Near-RT) RAN Intelligent Controller (RIC), a Non-Real Time (Non-RT) RIC, integrated access and backhaul (IAB) node, a relay node, a sidelink node, etc.

In some aspects, the UE 115k may transmit, to BS 105e, an indication associated with channel occupancy time (COT) sharing on sidelink communication. The UE 115k may receive, from the BS 105e, a COT indicator, wherein the COT indicator indicates to the UE 115k to initiate a COT on sidelink communication based on the indication associated with the COT sharing or the COT indicator indicates to the UE 115k to share the COT on sidelink communication based on the indication associated with the COT sharing on sidelink communication. The UE 115k may transmit, to the UE 115j, a communication during the COT on sidelink communication.

Figure 2:
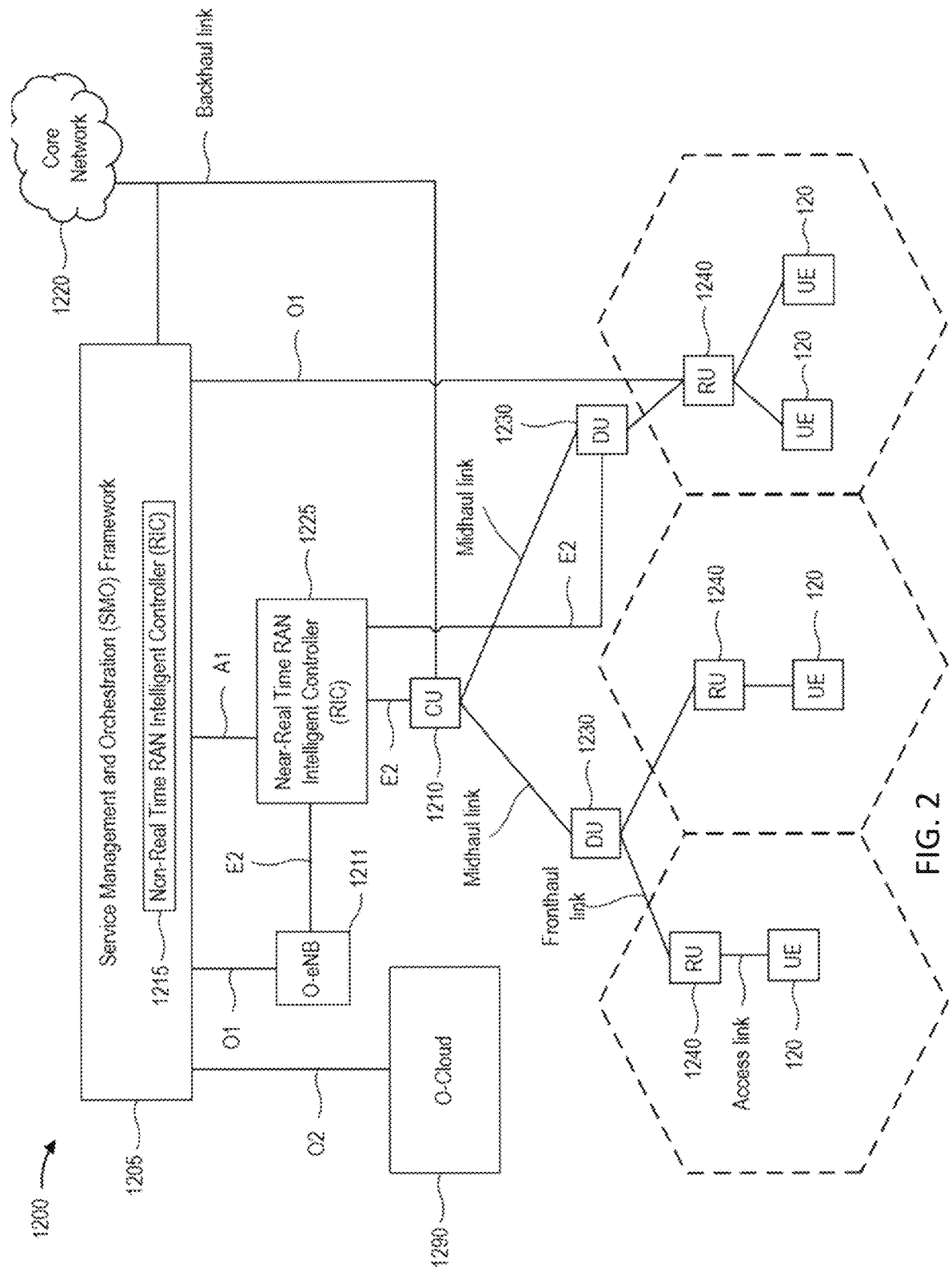
FIG. 2 illustrates an example disaggregated base station architecture according to some aspects of the present disclosure

FIG. 2 shows a diagram illustrating an example disaggregated base station 1200 architecture. The disaggregated base station 1200 architecture may include one or more central units (CUs) 1210 that can communicate directly with a core network 1220 via a backhaul link, or indirectly with the core network 1220 through one or more disaggregated base station units (such as a Near-Real Time (Near-RT) RAN Intelligent Controller (MC) 1225 via an E2 link, or a Non-Real Time (Non-RT) RIC 1215 associated with a Service Management and Orchestration (SMO) Framework 1205, or both). A CU 1210 may communicate with one or more distributed units (DUs) 1230 via respective midhaul links, such as an F1 interface. The DUs 1230 may communicate with one or more radio units (RUs) 1240 via respective fronthaul links. The RUs 1240 may communicate with respective UEs 120 via one or more radio frequency (RF) access links. In some implementations, the UE 120 may be simultaneously served by multiple RUs 1240.

Each of the units, i.e., the CUs 1210, the DUs 1230, the RUs 1240, as well as the Near-RT RICs 1225, the Non-RT RICs 1215 and the SMO Framework 1205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 1210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1210. The CU 1210 may be configured to handle user plane functionality (i.e., Central Unit-User Plane (CU-UP)), control plane functionality (i.e., Central Unit-Control Plane (CU-CP)), or a combination thereof. In some implementations, the CU 1210 can be logically split into one or more CU-UP units and one or more CU-CP units. The CU-UP unit can communicate bidirectionally with the CU-CP unit via an interface, such as the E1 interface when implemented in an O-RAN configuration. The CU 1210 can be implemented to communicate with the DU 1230, as necessary, for network control and signaling.

The DU 1230 may correspond to a logical unit that includes one or more base station functions to control the operation of one or more RUs 1240. In some aspects, the DU 1230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 1230 may further host one or more low PHY layers. Each layer (or module) can be implemented with an interface configured to communicate signals with other layers (and modules) hosted by the DU 1230, or with the control functions hosted by the CU 1210.

Lower-layer functionality can be implemented by one or more RUs 1240. In some deployments, an RU 1240, controlled by a DU 1230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1240 can be implemented to handle over the air (OTA) communication with one or more UEs 120. In some implementations, real-time and non-real-time aspects of control and user plane communication with the RU(s) 1240 can be controlled by the corresponding DU 1230. In some scenarios, this configuration can enable the DU(s) 1230 and the CU 1210 to be implemented in a cloud-based RAN architecture, such as a vRAN architecture.

The SMO Framework 1205 may be configured to support RAN deployment and provisioning of non-virtualized and virtualized network elements. For non-virtualized network elements, the SMO Framework 1205 may be configured to support the deployment of dedicated physical resources for RAN coverage requirements which may be managed via an operations and maintenance interface (such as an O1 interface). For virtualized network elements, the SMO Framework 1205 may be configured to interact with a cloud computing platform (such as an open cloud (O-Cloud) 1290) to perform network element life cycle management (such as to instantiate virtualized network elements) via a cloud computing platform interface (such as an O2 interface). Such virtualized network elements can include, but are not limited to, CUs 1210, DUs 1230, RUs 1240 and Near-RT RICs 1225. In some implementations, the SMO Framework 1205 can communicate with a hardware aspect of a 4G RAN, such as an open eNB (O-eNB) 1211, via an O1 interface. Additionally, in some implementations, the SMO Framework 1205 can communicate directly with one or more RUs 1240 via an O1 interface. The SMO Framework 1205 also may include a Non-RT RIC 1215 configured to support functionality of the SMO Framework 1205.

The Non-RT RIC 1215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1225. The Non-RT RIC 1215 may be coupled to or communicate with (such as via an A1 interface) the Near-RT RIC 1225. The Near-RT RIC 1225 may be configured to include a logical function that enables near-real-time control and optimization of RAN elements and resources via data collection and actions over an interface (such as via an E2 interface) connecting one or more CUs 1210, one or more DUs 1230, or both, as well as an O-eNB, with the Near-RT RIC 1225.

In some implementations, to generate AI/ML models to be deployed in the Near-RT RIC 1225, the Non-RT RIC 1215 may receive parameters or external enrichment information from external servers. Such information may be utilized by the Near-RT RIC 1225 and may be received at the SMO Framework 1205 or the Non-RT RIC 1215 from non-network data sources or from network functions. In some examples, the Non-RT RIC 1215 or the Near-RT RIC 1225 may be configured to tune RAN behavior or performance. For example, the Non-RT RIC 1215 may monitor long-term trends and patterns for performance and employ AI/ML models to perform corrective actions through the SMO Framework 1205 (such as reconfiguration via O1) or via creation of RAN management policies (such as A1 policies).

In some aspects, a method of wireless communication may be performed by the UE 120. The method may include monitoring a first set of physical downlink control channel (PDCCH) candidate resources for a PDCCH communication from the RU 1240, receiving, from the RU 1240, a plurality of demodulation reference signals (DMRSs) and decoding, based on a metric associated with the plurality of demodulation reference signals (DMRSs) satisfying a threshold, the PDCCH communication.

In some aspects, a first UE 120 may transmit a configuration to a second UE 120 indicating at least one of a length associated with a sidelink synchronization signal block (S-SSB) burst, a quasi-colocation (QCL) index associated with the S-SSB burst, or a first QCL order associated with the S-SSB burst. In some aspects, the first UE 120 may transmit the S-SSB burst to the second UE 120 based on the at least one of the length associated with the S-SSB burst, the QCL index associated with the S-SSB burst, or the first QCL order associated with the S-SSB burst.

In some aspects, a first UE 120 may transmit to the RU 1240, an indication associated with channel occupancy time (COT) sharing on sidelink communication. The first UE 120 may receive, from the RU 1240, a COT indicator, wherein the COT indicator indicates to the first UE 120 to initiate a COT on sidelink communication based on the indication associated with the COT sharing or the COT indicator indicates to the first UE 120 to share the COT on sidelink communication based on the indication associated with the COT sharing on sidelink communication. The first UE 120 may transmit, to a second UE 120, a communication during the COT on sidelink communication.

Figure 3:
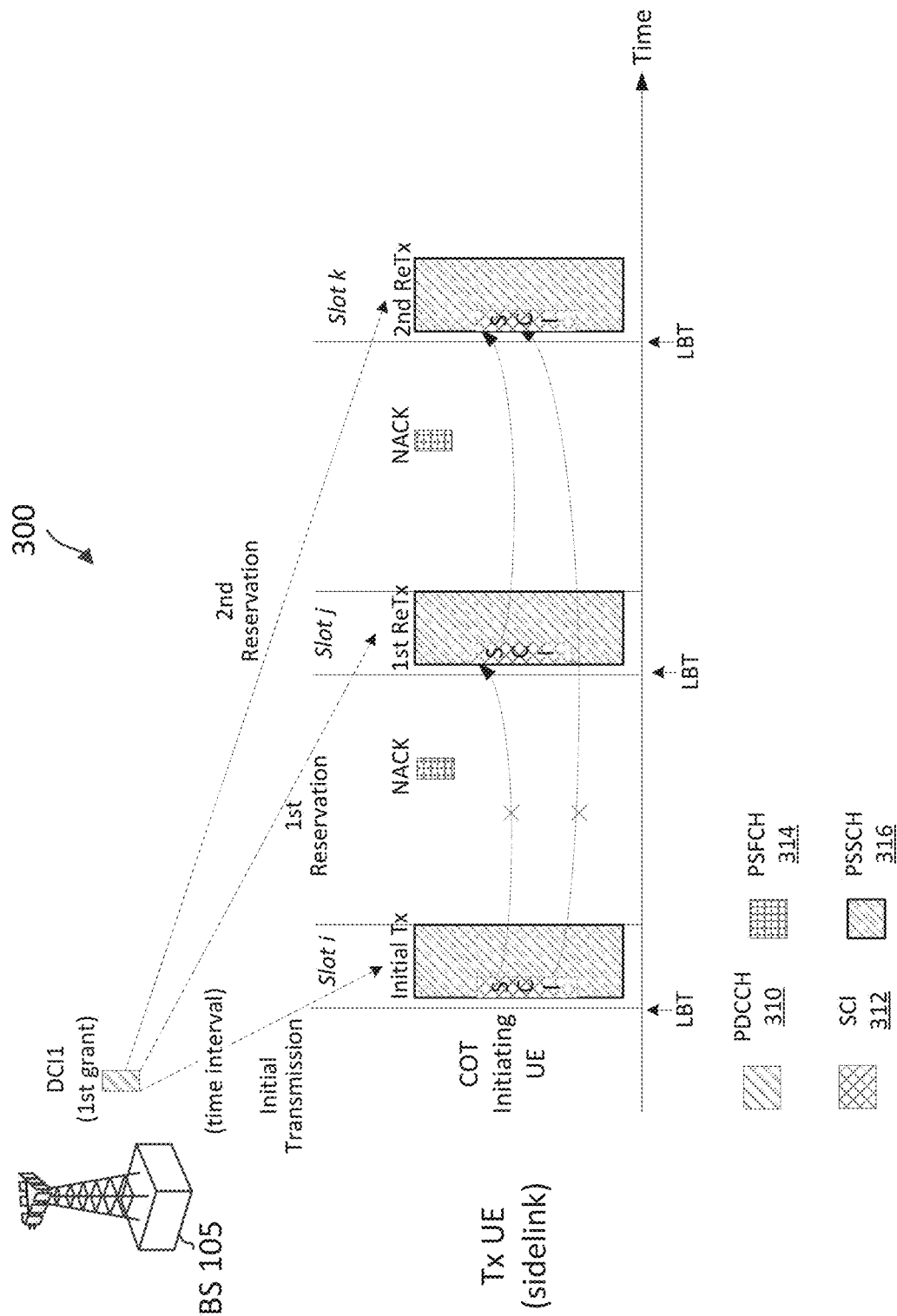
FIG. 3 illustrates an example of a resource configuration that supports COT sharing in sidelink communication according to some aspects of the present disclosure.

FIG. 3 illustrates an example of a resource configuration 300 that supports COT sharing in sidelink communication in accordance with some aspects of the present disclosure. The resource configuration 300 may be implemented by aspects of the wireless communications network 100 and/or the wireless communications network 1200. For example, the resource configuration 300 may be implemented for sidelink communications by one or more UEs, (e.g., UE 115, UE 120, or UE 700) such as described by the wireless communications network 100 and/or 1200. In FIG. 3, the x-axis represents time in some arbitrary units.

In some aspects, the BS 105 may transmit a sidelink resource allocation grant (e.g., resource allocation mode 1 with a dynamic grant) with one or more resource allocations (e.g., an initial transmission and/or one or two retransmissions) to a UE (e.g., UE 115, UE 120, or UE 700). The BS 105 may transmit the sidelink resource allocation grant to the UE via DCI (e.g., DCI format 3), a PDCCH message, a PDSCH message, or other suitable communication. The sidelink resource allocation grant for an initial transmission (e.g., in slot (i)) may be indicated to the UE with a time interval relative in time from when the sidelink grant (e.g., DCI 1) is received by the UE. The sidelink resource allocation grant may further indicate reserved resources (e.g., 2 sets of reserved resources) for retransmission(s) if the initial transmission fails (e.g., a HARQ NACK is transmitted in PSFCH 314 to the UE on sidelink). Additionally or alternatively, the resource allocation grant may further indicate reserved resources (e.g., 2 sets of reserved resources) for an initial transmission if the LBT fails at the initial transmission resource (e.g., at slot (i)). The UE may perform an LBT (e.g., a CAT 4 LBT, a CAT 2 LBT, or a CAT 3 LBT) or other clear channel assessment in an unlicensed frequency band (e.g., a shared frequency band) to gain access to the channel and initiate a COT to be shared with other UEs. The UE may perform an LBT before the resource for the initial transmission (e.g., slot (i)) in order to gain access to the channel and initiate a COT during slot (i). If the LBT is unsuccessful, then the UE may wait a period of time to perform another LBT based on the resources indicated in the sidelink resource allocation grant (e.g., the DCI 1). For example, the UE may wait until an offset from the next slot boundary between slot (i) (e.g., the initial transmission resource) and slot (j) (e.g., the first reserved resource) to perform another LBT. If the subsequent LBT before slot (j) is successful, then the COT initiating UE may initiate the COT starting at slot (j) and transmit an initial transmission on sidelink with a PSSCH 316 and/or a PSCCH 312 in slot (j). If the LBT fails at slot (j), the COT initiating UE may perform a subsequent LBT before slot (k) (e.g., the second reserved resource). If the LBT before slot (k) is successful, then the COT initiating UE may transmit an initial transmission on sidelink to initiate a COT with a PSSCH 316 and/or a PSCCH 312 in slot (k). Due to the uncertainty in when the COT initiating UE will perform a successful LBT, the time when the COT initiating UE acquires the channel and starts a COT to be shared with other UEs in proximity is unknown to the BS 105. Therefore, the BS 105 cannot schedule the other UEs to share the COT initiated by the COT initiating UE and the COT sharing UEs may miss the opportunity to seamlessly share the COT.

Figure 4:
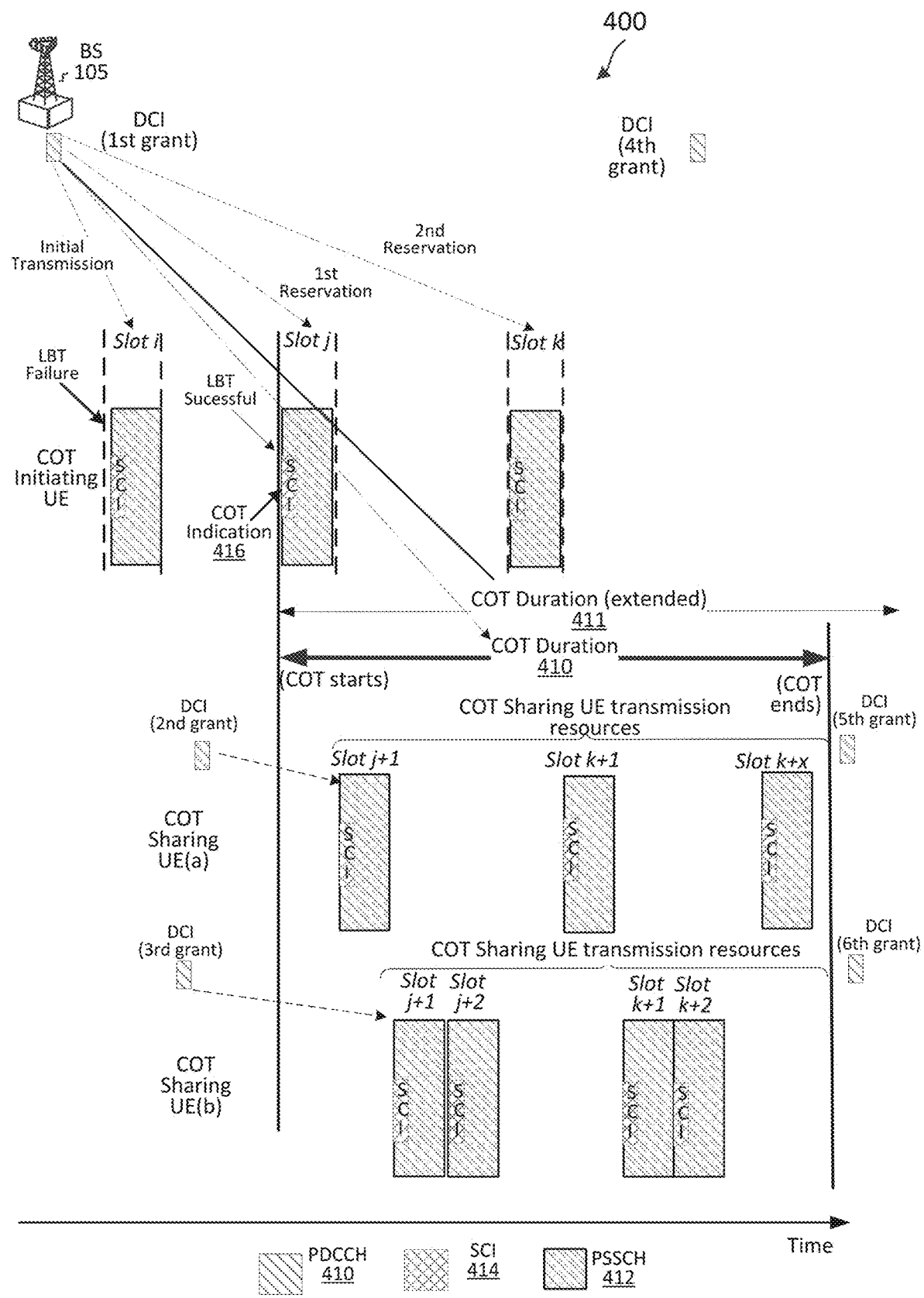
FIG. 4 illustrates an example of a resource configuration that supports COT sharing in sidelink communication according to some aspects of the present disclosure.

FIG. 4 illustrates an example of a resource allocation 400 that supports COT sharing in sidelink communication in accordance with some aspects of the present disclosure. The resource allocation 400 may be implemented by aspects of the wireless communications network 100 and/or the wireless communications network 1200. For example, the resource configuration 400 (e.g., resource allocation mode 1 with dynamic grant) may be implemented for sidelink communications by one or more UEs, (e.g., UE 115, UE 120, or UE 700) such as described by the wireless communications network 100 and/or 1200. In FIG. 4, the x-axis represents time in some arbitrary units.

In some aspects, a COT initiating UE (e.g., the UE 115, the UE 120, or the UE 700) may transmit, to a network unit (e.g., the BS 105), an indication associated with channel occupancy time (COT) sharing on sidelink communication. In this regard, the COT initiating UE may transmit the indication to the network unit via uplink control information (UCI), a physical uplink control channel (PUCCH) message, a physical uplink shared channel (PUSCH) message, a medium access control control element (MAC CE), an RRC message, or other suitable communication. In some aspects, the indication associated with the COT sharing on sidelink communication may include a sidelink buffer status report (SL-BSR) associated with the COT initiating UE. The SL-BSR associated with the COT initiating UE may include a COT initiating request. The COT initiating request may indicate to the network unit that the COT initiating UE requests a COT indicator that indicates the COT initiating UE to initiate a COT and share the COT with a COT sharing UE(a) (e.g., a sidelink UE such as the UE 115, the UE 120, or the UE 700), a COT sharing UE(b), and/or other UEs. In some aspects, multiple UEs may each transmit a request to the network unit requesting to initiate a COT or share a COT. The network unit may determine which UE will initiate the COT and which UEs will share the COT as described in greater detail herein. In some aspects, a sidelink communication may have a relatively small data size (e.g., less than 3824 bits, less than 1024 bits, less than 512 bits), and thus may not require all resources in the shared frequency band (e.g., an unlicensed frequency band) and/or the entire COT duration 410. Accordingly, COT sharing UE(a) and UE(b) may share the COT with the COT initiating UE and utilize any remaining resources (e.g., sharing in time such as TDM, in frequency such as FDM, or a combination of both TDM and FDM) after the COT initiating UE transmits within the COT. The COT initiating UE may transmit a COT start indicator to the COT sharing UE(a) and UE(b) after a successful LBT. Mechanisms for sidelink COT sharing are described in greater detail herein.

In some aspects, the SL-BSR associated with the COT sharing UE(a) and UE(b) may include a COT sharing request. The COT sharing request may indicate to the network unit that the COT sharing UE(a) and UE(b) request a COT indicator that indicates the COT sharing UE(a) and UE(b) to share the COT with the COT initiating UE.

In some aspects, the SL-BSR associated with the COT sharing UEs and the COT initiating UE may include a location. The location (e.g., a zone identity, a beam coverage pattern, a cell sector, a latitude/longitude range, a geofence) associated with the COT sharing UEs and the COT initiating UE may be used by the network unit to determine aspects of COT sharing for one or more UEs. For example, the location of the COT sharing UEs and the COT initiating UE may indicate a potential communication range in proximity between the COT sharing UEs, the COT initiating UE, and one or more other UEs, so that the UEs in such communication range in proximity may share the channel occupancy for sidelink communications. The network unit may use the potential communication range to determine aspects of COT sharing (e.g., a UE may not be able to detect the COT start indicator from the COT initiating UE and thus may not be able to share the COT initiated by the COT initiating UE if the UE is out of a certain communication range from the COT initiating UE). The network unit may determine COT sharing parameters based on the location of the COT sharing UEs and the COT initiating UE. For example, the network unit may determine whether the UEs may be indicated as a COT initiating UE and/or a COT sharing UE based on the location of the UEs. Additionally or alternatively, the network unit may determine a COT identifier and/or a COT duration based on the location of the COT sharing UEs, the COT initiating UE and/or a location of one or more other UEs. In some aspects, the COT sharing UEs and the COT initiating UE may determine its location based on GPS coordinates, radio frequency triangulation, or other suitable method. Additionally or alternatively, the COT sharing UEs and the COT initiating UE may determine its location based on a zone identity. In this regard, the COT sharing UEs and the COT initiating UE may determine its zone identity based on 3GPP TS 38.331, section 5.8.11 or other standard specification. Additionally or alternatively, the network unit may determine a COT identifier and/or a COT duration based on the number of the COT sharing UEs, the COT initiating UE and/or one or more other UEs in the proximity for sidelink communication.

In some aspects, the SL-BSR associated with the COT sharing UEs and the COT initiating UE may include a packet delay budget (PDB) associated with data of the COT sharing UEs and the COT initiating UE respectively. The packet delay budget may be a maximum time delay associated with transmission of a transport block. A time delay sensitive TB may have a packet delay budget in which the TB needs to be received based on the QoS (e.g., one or more QoS profiles) of the service or application. For example, a time delay sensitive TB may be transmitted by an industrial Internet of things (IoTs) device (e.g., a meter, a programmable logic controller, a sensor, a robot, an actuator, etc.) and/or a vehicle-to-everything (V2X) device. The IoT and/or V2X devices may communicate data in TBs that are time delay sensitive and/or requires high reliability (e.g., ultra-reliable low latency communications (URLLCs) or other time sensitive and/or high priority communications). For example, a UE such as sensor of a robot may need to transmit sensor data to a controller in real time or approximately real time. As another example, a vehicle may need to transmit safety related data to another vehicle in real time or approximately real time. The packet budget delay may be indicated as a number of milliseconds, a number of slots, a number of sub-slots, a number of symbols, or other time based metric. Additionally or alternatively, the network unit may determine a COT identifier, a COT duration, and/or the resource allocations for initiating the COT and/or for sharing the COT based on the PDBs associated with the data of the COT sharing UEs and the COT initiating UE.

In some aspects, the SL-BSR associated with the COT sharing UEs and the COT initiating UE may include a priority associated with data (e.g., TB(s)) of the COT sharing UEs and the COT initiating UE respectively. The priority associated with the data of the COT sharing UEs and the COT initiating UE may be indicated as a priority class. The priority class may be based on the QoS (e.g., one or more QoS profiles) of a service, and/or an application associated with the TB. Example services having different priority levels may include, without limitation, conversational voice, video streaming, V2X messages, mission critical data, background data, enhanced mobile broadband, remote control, discrete automation, etc. For example, a TB representing conversational voice data may have a higher priority than a TB representing a text message. The priority level may be indicated as a code point, a number, a QOS, or other suitable indicator. Additionally or alternatively, the network unit may determine a COT identifier, a COT duration, and/or the resource allocations for initiating the COT and/or for sharing the COT based on the priorities associated with the data of the COT sharing UEs and the COT initiating UE.

The COT sharing UEs and the COT initiating UE may receive a COT indicator. In this regard, the COT sharing UEs and the COT initiating UE may receive the COT indicator from a network unit (e.g., BS 105) via downlink control information (e.g., DCI format 3 on a physical downlink control channel (PDCCH)), a MAC CE, a radio resource control (RRC) message (e.g., on a physical downlink shared channel (PDSCH)), or other suitable communication. In some aspects, the COT indicator may indicate to the COT initiating UE to initiate a COT. When the COT initiating UE is indicated as a COT initiator, the COT initiating UE may perform a listen-before-talk (LBT) procedure or other clear channel assessment (CCA) on one or more sidelink communication channels based on receiving the COT indicator. The COT initiating UE may perform an LBT procedure or other CCA to gain access to the channel and initiate a COT in an unlicensed band (e.g., a shared frequency spectrum). For example, the COT initiating UE may perform a category 2 LBT, a category 3 LBT, and/or a category 4 LBT to gain access to the channel initiate a COT in an unlicensed frequency spectrum. In some aspects, the COT initiating UE may perform the LBT in one or more frequency resources. The frequency resources may include a frequency spectrum, a frequency band, a frequency subband, a frequency subchannel, resource elements, resource blocks, and/or a frequency interlace (e.g., for meeting minimum OCB requirement). In some aspects, the COT initiating UE may perform the LBT for one or more directional beams (e.g., a beam in the direction of the UE that the COT initiating UE intends to transmit a communication to).

In some aspects, the COT indicator may indicate a resource allocation (e.g., time resources and/or frequency resources) to the COT initiating UE. The resource allocation may indicate resources that the COT initiating UE may use to transmit and/or retransmit communications. The resource allocation for the COT initiating UE may indicate one or more resources in time such as in slots (e.g., slots i, j, and k), sub-slots (e.g., mini-slots), and/or symbols. The resources in frequency may include a frequency spectrum, a frequency band, a frequency sub-band, a frequency subchannel, resource elements, resource blocks, and/or a frequency interlace (e.g., for meeting minimum OCB requirement). When the COT initiating UE is indicated as a COT initiating UE, the first resource may be based on a time interval (e.g., a relative time interval) from when the resource allocation via the DCI 1st grant is received at the COT initiating UE (e.g., slot (i) or sub-slot (i) or symbol (i)) after the time interval upon receiving the resource allocation DCI 1st grant, and/or the other resources (e.g., the 1st reservation and/or the 2nd reservation) may be based on the priority, PDB, HARQ feedback, and/or other parameters associated with the COT initiating UE's data transmissions as well as the COT duration 410 included in the COT indicator (e.g., via the DCI 1st grant). The COT initiating UE may start a COT at one of slot (i), slot (j), or slot (k) after a successful LBT. Additionally or alternatively, the COT initiating UE may start a COT at one of sub-slot (i), sub-slot (j) or sub-slot (k) within a slot, or symbol (i), symbol (j), or symbol (k) within a sub-slot or slot after a successful LBT. When the COT indicator indicates that the UE is a COT sharing UE, the resource allocation may be based on a relative time interval from when the COT is initiated or started (e.g., COT initiating UE gains the channel and initiates the COT at slot (j) based on a successful LBT before slot (j)).

In some aspects, the starting point of the COT may be based on the COT initiating UE performing a first successful LBT for initiating the COT. For example, the COT initiating UE may receive a COT indicator from the BS 105 allocating resources to the COT initiating UE in slot (i), slot (j), and slot (k) (or sub-slot (i), sub-slot (j), and sub-slot (k) within a slot, or symbol (i), symbol (j), and symbol (k) within a sub-slot or slot). Slot (i), slot (j), and slot (k) (or sub-slot (i), sub-slot (j), and sub-slot (k) within a slot, or symbol (i), symbol (j), and symbol (k) within a sub-slot or slot) may be contiguous or non-contiguous in time (as shown in FIG. 4). The COT initiating UE may perform an LBT before slot (i) (or sub-slot (i) within a slot or symbol (i) within a slot or sub-slot) in order to gain access to the channel and initiate a COT in slot (i) (or sub-slot (i) within a slot or symbol (i) within a slot or sub-slot). If the LBT is unsuccessful, then the COT initiating UE may wait a period of time (e.g., based on the resource allocations indicated in DCI 1st grant)) to perform another LBT. For example, the COT initiating UE may wait until an offset from slot (j) (e.g., the resource such as 1st reservation) to perform another LBT. If the subsequent LBT is successful, then the COT initiating UE may gain the channel and initiate a COT starting at slot (j). The COT initiating UE may transmit a communication in slot (j) based on the successful LBT.

In some aspects, the COT indicator may indicate a COT identifier. In some aspects, the COT initiating UE may receive a COT indicator from the BS 105 indicating a COT identifier. The COT identifier may identify a COT that the COT initiating UE may initiate and share with COT sharing UEs. The COT initiating UE may transmit the COT identifier included in the COT indication 416 to the COT sharing UEs via SCI 418 (e.g., SCI part 1 (SCI-1) on PSCCH or SCI part 2 (SCI-2) multiplexed with PSSCH 412). The COT identifier may identify a COT that may be shared among sidelink UEs in proximity to one another. For example, the COT initiating UE and the COT sharing UE(a) and UE(b) may each transmit their respective locations (e.g., zone identity) to the BS 105 via a SL-BSR. In response to receiving the SL-BSRs, the BS 105 may determine that the COT initiating UE and the COT sharing UE(a) and UE(b) have a common zone identity or zone identities for adjacent or close zones in a proximity. The BS 105 may transmit the COT identifier to the COT initiating UE and the COT sharing UE(a) and UE(b). Additionally or alternatively, the COT initiating UE may transmit the COT identifier to the COT sharing UE(a) and UE(b) in the COT indication 416 via SCI 418 (e.g., SCI-1 or SCI-2) after the first successful LBT. Additionally or alternatively, the COT initiating UE may transmit the COT identifier to the COT sharing UE(a) and UE(b) in the COT indication via SCI 414 (e.g., SCI-1 or SCI-2) after any successful LBT during the COT duration or before the COT ends.

In some aspects, the COT indicator may indicate a COT duration 410. The COT duration 410 may indicate a time period that the COT initiating UE and the COT sharing UE(s) may transmit in (e.g., sharing occupying the channel in the COT duration 410). In some aspects, the COT duration 410 may be based on an amount of data (e.g., number of TBs) the COT initiating UE and the COT sharing UE(s) need to transmit. A larger amount of data may require a longer COT duration 410 as compared to a smaller amount of data. The amount of data to be transmitted by the COT initiating UE and the COT sharing UE(s) may be indicated to the BS 105 in the SL-BSRs. The COT duration 410 may be indicated to the COT initiating UE and the COT sharing UE(s) as a number of slots, a number of sub-slots, a number of symbols, a number of milliseconds, or a combination thereof. In some aspects, the COT initiating UE may receive the COT duration 410 from the network unit. The COT initiating UE may then transmit the COT duration 410 to the COT sharing UEs in the COT indication 416 via SCI 418 (e.g., SCI-1 or SCI-2) after a first successful LBT for initiating the COT. In some aspects, the COT duration 410 may be a fixed time duration. In some aspects, the COT duration 410 may be a variable time duration. For example, the COT initiating UE and/or the COT sharing UE(s) may decide to extend the COT duration 410 beyond an initial COT duration 410 based on the data volumes (e.g., data in the buffer for transmission), the priority of the data, the latency of the data (e.g., PDB of the data), etc. associated with the COT initiating UE and/or the COT sharing UE(s). The COT initiating UE and/or the COT sharing UE(s) may transmit a COT extension indication (e.g., via a UCI on PUCCH or PSSCH or a MAC CE) to the BS 105 indicating the COT extension (e.g., extension by a number of slots or subframe or radio frames relative to or referenced from the COT extension point such as the COT extension indication transmitted by the UE or the extended or updated COT duration). In response, the BS 105 may schedule resources, including indication of the updated COT duration, to the COT initiating UE and/or the COT sharing UE(s) within the extended COT. In this case, the COT extension may be indicated to other UEs in proximity in the COT extension indication (e.g., with updated COT duration 411 via SCI (e.g., SCI-1 or SCI-2) or sidelink MAC CE) by the UE which has accessed the channel and extended the COT before the COT ends. For another example, the COT initiating UE and/or the COT sharing UE(s) may transmit updated SL-BSR(s) to the BS 105 indicating more data available for transmissions. In response, the BS 105 may decide to extend the COT duration based on the updated SL-BSR(s) (e.g., based on the data in the buffer for transmission, the priority of the data, the latency of the data (e.g., PDB of the data, etc.) and indicate a COT extension with an updated COT duration and schedule one or more resources to the COT initiating UE and/or the COT sharing UE(s) within the extended COT (e.g., updated COT duration 411).

In some aspects, the resource allocation in time may be indicated to the COT sharing UE(a) and UE(b) relative to the start (e.g., the beginning) of the COT. The starting point of the COT may be based on the COT initiating UE performing a first successful LBT at the resources indicated to the COT initiating UE. For example, the COT initiating UE may receive resource allocation from the network unit allocating resources in slots (or sub-slots of a slot or symbols of a slot or sub-slot) i, j, and k, where i, j, or k is the index of the starting slot (or sub-slot of a slot or symbol of a slot or sub-slot) of the COT based on the results of the first LBT per the received resource allocation. The COT sharing UE(a) may receive a resource allocation from the network unit allocating resources in slots (j+1), (k+1), and (k+x) relative to the COT starting point slot (j). The starting slot (j) of the COT may be the slot immediately following the first successful LBT. Slot (j+1) may be contiguous in time to slot (j) for sharing the COT. By allocating contiguous time resources among the COT initiating UE and the COT sharing UE(a) and UE (b), the probability of maintaining the COT from being accessed by other devices (e.g., WiFi devices) may be increased as compared to allocating resources with time gaps (e.g., not relative to the COT starting point where the COT starting point is based on the first successful LBT at one of the allocated resources to the COT initiating UE) during which other devices may gain access to the COT. The resource allocations may be based on the SL-BSRs transmitted by the COT sharing UE(a) and UE(b) to the BS 105. In some aspects, the number of slots, sub-slots, symbols, and/or frequency channels allocated to the COT sharing UE(a) and UE(b) may be based on the amount of data (e.g., number of TB(s)) to be transmitted by the COT sharing UE(a) and UE(b). For example, COT sharing UE(a) may be allocated single slots multiplexed in time with the COT initiating UE and the COT sharing UE(b). COT sharing UE(b) may have a larger amount of data to transmit as compared to COT sharing UE(a) and therefore may be allocated multiple slots for each channel accessing (e.g., two contiguous slots j+1, j+2 for one channel accessing and slots k+1, k+2 for another channel accessing) for high data rate sidelink communication multiplexed in time (e.g., TDM) with the COT initiating UE and the COT sharing UE(a). The allocated resources may be contiguous in time for maintaining the channel occupancy or sharing the COT. In some aspects, the allocated resources may be multiplexed in time (e.g., TDM) and/or in frequency (e.g., FDM) or combination of both with resources allocated to other COT sharing UEs and/or the COT initiating UE. In some aspects, the allocated resources may be frequency interlaced to meet minimum OCB requirement.

In some aspects, the resource allocation may be based on the priority, latency (e.g., packet delay budget), data rate, and/or reliability (e.g., error rate) associated with the TBs to be transmitted by the COT sharing UE(s). For example, COT sharing UE(a) may transmit a TB having a higher priority or short packet delay budget and be allocated resources earlier in time than COT sharing UE(b) having a lower priority or longer packet delay budget. In some aspects, a UE having higher data rate or reliability (e.g., lower error rate) TB(s) to transmit may be allocated more resources than a UE having lower data rate or reliability (e.g., higher error rate) TB(s) to transmit.

In some aspects, the COT initiating UE may transmit a communication (e.g., one or more TBs) during the COT in slot (j) and slot (k) after a first successful LBT is performed before slot (j). In this regard, the COT initiating UE may transmit a communication to the BS 105 after slot (j) via UCI on PUCCH or PUSCH, MAC CE, or other suitable communication for indicating that the COT has been initiated. In some aspects, the COT initiating UE may transmit a communication (e.g., one or more TBs or MAC CEs via SCI-1 on PSCCH, SCI-2 on PSSCH, or other suitable communication signaling or message) in slot (j) and/or slot (k) to a sidelink UE after a successful LBT.

The COT sharing UE(a) and UE(b) may receive the COT indication 416 from the COT initiating UE via SCI 418 (e.g., SCI-1 or SCI-2) after the COT initiating UE performs a first successful LBT. The COT indication 416 may implicitly indicate the start of the COT and may include the COT ID, and/or the COT duration 410. The COT sharing UE(a) and UE(b) may perform a reduced category LBT (e.g., a CAT 2 LBT) in the resources allocated to the COT sharing UE(a) and UE(b) relative to or referenced to the start of the COT. If the reduced category LBT is successful, then the COT sharing UE may transmit one or more communications (e.g., one or more TBs) in their respective allocated resources relative to or referenced to the start of the COT.

Figure 5:
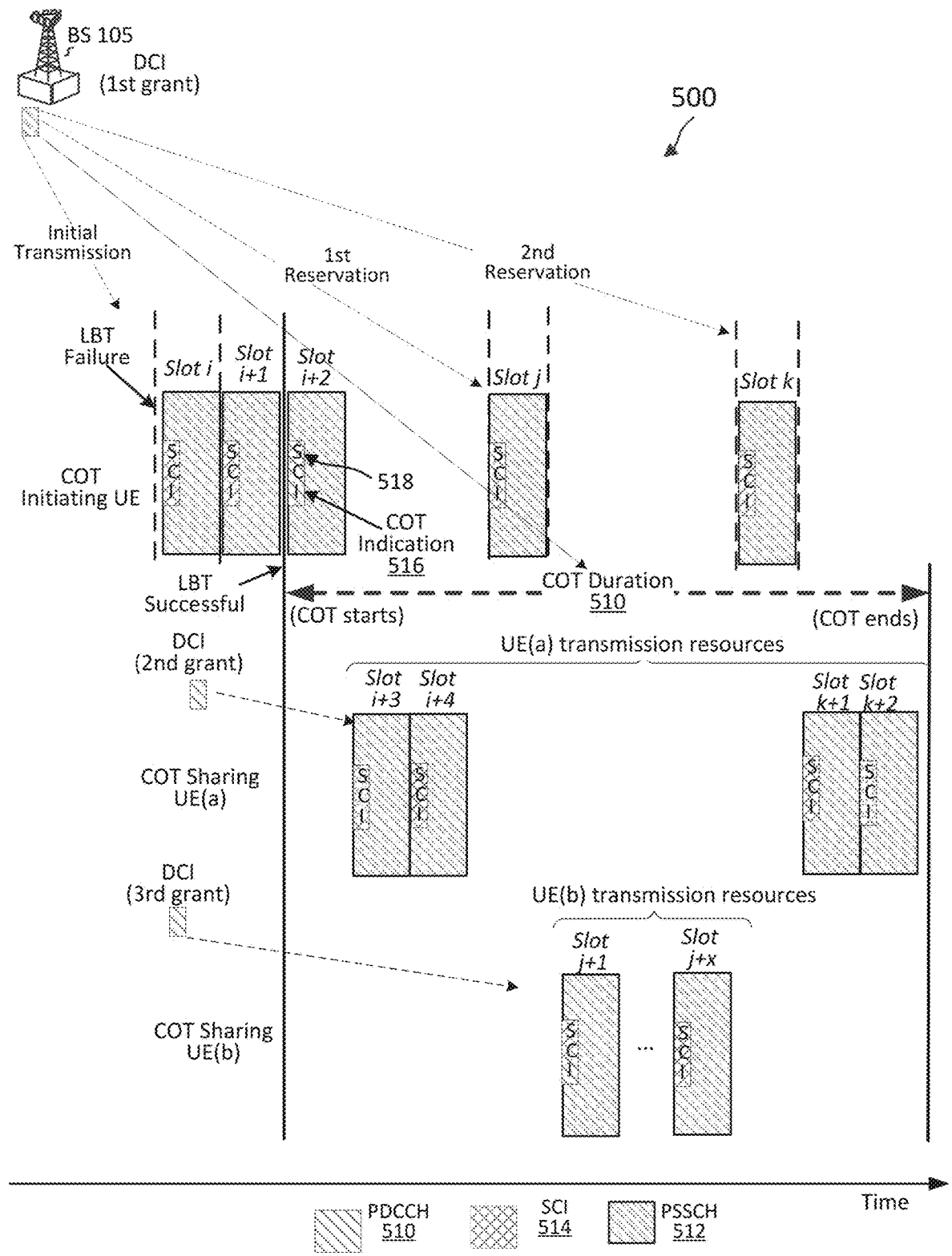
FIG. 5 illustrates an example of a resource configuration that supports COT sharing in sidelink communication according to some aspects of the present disclosure.

FIG. 5 illustrates an example of a resource allocation 500 that supports COT sharing in sidelink communication in accordance with some aspects of the present disclosure. The resource allocation 500 may be implemented by aspects of the wireless communications network 100 and/or the wireless communications network 1200. For example, the resource allocation 500 (e.g., resource allocation mode 1 with dynamic grant) may be implemented for sidelink communications by one or more UEs, (e.g., UE 115, UE 120, or UE 700) such as described by the wireless communications network 100 and/or 1200. In FIG. 5, the x-axis represents time in some arbitrary units.

FIG. 5 illustrates an example of a resource allocation 500 that supports COT sharing similar to the example of FIG. 4. FIG. 5 illustrates variations of the COT sharing resource allocation. For example, FIG. 5 illustrates contiguous slots (or sub-slots of a slot or symbols of a slot or sub-slot) (i), (i+1), and (i+2) for the COT initiating UE to perform LBT(s) in order to gain the channel and initiate a COT in contrast to FIG. 4 which illustrates non-contiguous slots (or sub-slots of a slot or symbols of a slot or sub-slot) (i), (j), and (k) for the COT initiating UE to perform LBT(s) in order to gain the channel and initiate a COT. Resources allocated to the COT initiating UE in contiguous slots (or sub-slots of a slot or symbols of a slot or sub-slot) (i), (i+1), and (i+2) may allow the COT initiating UE more opportunities to perform a successful LBT thereby reducing the latency to acquire the channel and initiate a COT.

FIG. 5 illustrates a variation in the resource allocation for the COT sharing UEs. In FIG. 4, COT sharing UE(a) is allocated single slots (j+1), (k+1), and (k+x) multiplexed in time with resources allocated to the COT sharing UE(b) and the COT initiating UE, while COT sharing UE(b) is allocated more than one slot for each channel accessing (e.g., slots (j+1), (j+2) for one channel accessing, and slots (k+1), (k+2) for another channel accessing), multiplexed in time with resources allocated to the COT sharing UE(a) and the COT initiating UE. In some aspects, as shown in FIG. 5, COT sharing UE(a) is allocated multiple slots for each channel accessing (slots (j+1), (j+2) for one channel accessing, and slots (k+1), (k+2) for another channel accessing), multiplexed in time with resources allocated to the COT sharing UE(a) and the COT initiating UE while COT sharing UE(b) is allocated x contiguous slots from slot (j+1) to slot (j+x) (e.g., contiguous transmissions and/or retransmissions with same or different TBs). FIGS. 4 and 5 illustrate variations of resource allocations for COT sharing UEs and COT initiating UEs, however, the present disclosure is not so limited to the examples described with reference to FIGS. 4 and 5.

As illustrated in FIGS. 4 and 5, the COT starting point may vary within the time duration or a time window between the first resource and the last resource allocated to the COT initiating UE for initiating a COT (e.g., the time duration between and including slot (or sub-slot of a slot or symbol of a slot or sub-slot) i and slot (or sub-slot of a slot or symbol of a slot or sub-slot) k in FIG. 4 or the time duration between and including slot (or sub-slot of a slot or symbol of a slot or sub-slot) i and slot (or sub-slot of a slot or symbol of a slot or sub-slot) i+2 in FIG. 5. Therefore, the resources allocated to the COT sharing UEs based on the starting point of a shared COT may vary within this time duration and the feedback resources (e.g., PSFCH allocations) associated to the transmissions based on the starting point of a shared COT may also vary within this time duration in a resource pool. In some aspects, one PUCCH occasion may be allocated based on this variation in time (e.g. relative to or referenced from the last possible PSFCH) for the COT sharing UEs to report HARQ based ACK or NACK to the BS 105. In some aspects, multiple PUCCH occasions may be allocated based on this variation in time (e.g. each PUCCH occasion is relative to or referenced from each possible PSFCH within the time duration) for the COT sharing UEs to report HARQ based ACK or NACK to the BS 105.

As illustrated in FIGS. 4 and 5, the initial COT indication (e.g., the COT indication 416 on SCI 418 in FIG. 4 or the COT indication 516 on SCI 518 in FIG. 5) for starting a COT by the COT initiating UE may be indicated via an SCI to other UEs in proximity. Additionally or alternatively, the initial COT indication for starting a COT by the COT initiating UE may be indicated via a sidelink MAC CE to other UEs in proximity.

In some aspects, the initial COT indication may be transmitted by the COT initiating UE with the first transmission initiating a COT. In this case, the initial COT indication to other UEs in proximity may include the COT ID and/or the COT duration. The sidelink resource grants to the COT sharing UEs (e.g., DCI 2nd grant or DCI 3rd grant from the BS 105 as illustrated in FIGS. 4 and 5) may be transmitted prior to the first possible COT starting point (e.g., the first resource indicated to the COT initiating UE to initiate a COT) so that the COT sharing UEs may be aware of the COT sharing based on the COT indicator (e.g., containing one or more COT IDs and the associated COT durations respectively) in the received DCIs (e.g., DCI 2nd grant or DCI 3rd grant from the BS 105 as illustrated in FIGS. 4 and 5). A COT sharing UE may monitor the initial COT indication(s) accordingly (e.g., based on the one or multiple COT IDs indicated in the COT indicator in the received DCI). With multiple COT IDs indicated, a COT sharing UE may select the resource(s) relative to or referenced from the first detected initial COT indication (e.g., the starting point of the first COT) associated to one of the multiple COT IDs. The transmission resources for the COT sharing UEs may be allocated as relative to or referenced from the starting point (e.g., an index of a slot or a sub-slot or a symbol where an initial COT indication is detected).

In some aspects, an additional COT indication (e.g., containing the COT ID and the COT starting point and/or the COT duration) may be transmitted with each transmission by the COT initiating UE or the COT sharing UEs after the COT starting point and within the COT duration (e.g., associated to the COT ID). In this case, the sidelink resource grants to the COT sharing UEs may be transmitted prior to the first possible COT starting point (e.g., DCI 2nd grant or DCI 3rd grant as illustrated in FIGS. 4 and 5) so that the COT sharing UEs may be aware of the COT sharing and monitor the initial COT indication; or the sidelink resource grants to a UE (e.g., the COT initiating UE or the COT sharing UE) may be transmitted after the COT starting point and within the COT duration (e.g., DCI 4th grant to the COT initiating UE as illustrated in FIG. 4) so that the UE (e.g., the COT initiating UE or the COT sharing UE) may be aware of the COT sharing and monitor the additional COT indication associated to the COT ID accordingly. The transmission resources for the COT initiating UE or the COT sharing UEs may be allocated as relative to or referenced from the starting point (e.g., an index of a slot or a sub-slot or a symbol as indicated in an additional COT indication detected). In this case, the additional COT indications associated to the COT ID may also indicate the continuation or the validation of the COT.

In some aspects, a COT indication may be transmitted on an uplink channel to the BS 105 by the COT initiating UE after the first transmission initiating a COT. In some aspects, the COT indication on an uplink channel may be an explicit indication (e.g., via UCI or MAC CE) including the COT starting point optionally with the COT ID and/or the COT duration. In some aspects, the COT indication on uplink may be an implicit indication. For example, the COT indication on uplink may be implicitly indicated via the first ACK/NACK transmitted by the COT initiating UE, where the first ACK/NACK is at one of multiple PUCCH occasions respectively associated with the multiple transmission resources allocated to the COT initiating UE for starting a COT. For another example, the COT indication on uplink may be implicitly indicated via the first report on uplink such as CSI report transmitted by the COT initiating UE, where the first report is at one of multiple PUCCH or PUSCH occasions respectively associated with the multiple transmission resources (e.g., transmissions triggering the CSI report) allocated to the COT initiating UE for starting a COT. The sidelink resource grants to the COT initiating UEs (e.g., DCI 4th grant as illustrated in FIG. 4) or the COT sharing UEs transmitted after the received COT indication on uplink (e.g., indicating at least the COT starting point) may include the COT starting point and the COT ID and/or the COT duration, and the transmission resources for the COT initiating UE or the COT sharing UEs may be allocated as relative to or referenced from this starting point (e.g., an index of a slot or a sub-slot or a symbol).

In some aspects, the COT extension indication (e.g., a COT indication with updated or activated new COT duration associated to the COT ID) may also be indicated with SCI (e.g., SCI-1 or SCI-2) or MAC CE on sidelink (e.g., on PSCCH or PSSCH) to other UEs in proximity and/or with UCI or MAC CE on uplink (e.g., on PUCCH or PUSCH) to the BS 105 by the UE (e.g., the COT initiating UE or the COT sharing UE) extending the COT. In some aspects, the COT extension indication (e.g., a COT indication with updated or activated new COT duration associated to the COT ID) may also be indicated with DCI or MAC CE on downlink (e.g., on PDCCH or PDSCH) to UEs (e.g., the COT initiating UE or the COT sharing UEs) by the BS 105 extending the COT. In some aspects, the COT extension indication may be indicated by the UE (e.g., the COT initiating UE or the COT sharing UE) extending the COT or by the BS 105 extending the COT before the COT ends. In some aspects, the sidelink resource grants to a UE (e.g., the COT initiating UE or the COT sharing UEs) transmitted after the COT extension indication (e.g., DCI 5th grant or DCI 6th grant as illustrated in FIG. 4) may be allocated as relative to or referenced from the COT extension point (e.g., an index of a slot or a sub-slot or a symbol associated with the COT extension indication transmitted by the UE extending the COT or by the BS 105 extending the COT).

Figure 6:
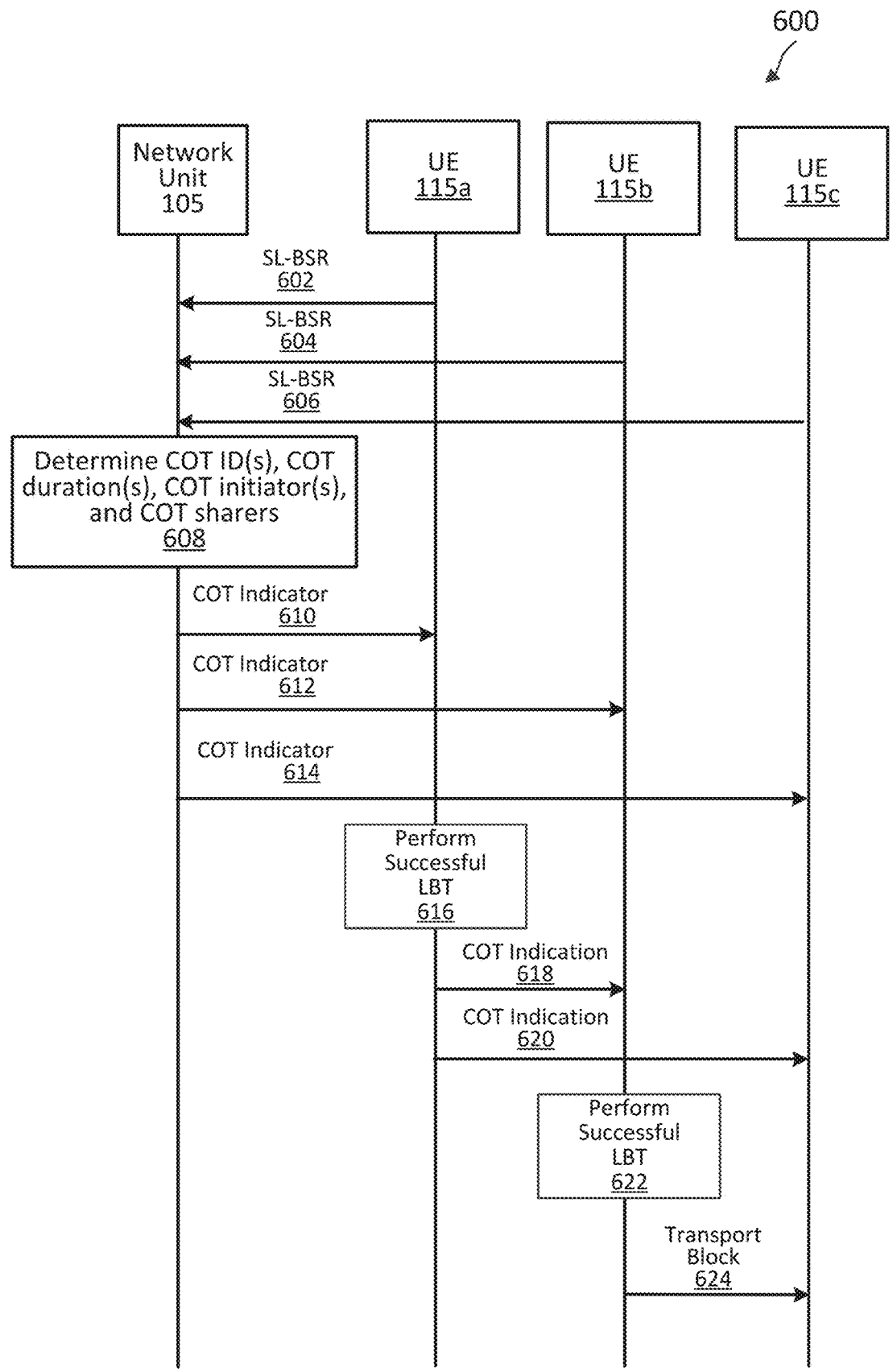
FIG. 6 is a signaling diagram of a wireless communication method according to some aspects of the present disclosure.

FIG. 6 is a signaling diagram of a wireless communication method 600 according to some aspects of the present disclosure. Actions of the communication method 600 can be executed by a computing device (e.g., a processor, processing circuit, and/or other suitable component) of a communication device or other suitable means for performing the actions. For example, a wireless communication device, such as the UE 115, UE 120, or UE 700, may utilize one or more components, such as the processor 702, the memory 704, the COT sharing module 708, the transceiver 710, the modem 712, and the one or more antennas 716, to execute aspects of method 600. A wireless communication device, such as the BS 105, the CU 1210, the DU 1230, the RU 1240, and/or the network unit 800 may utilize one or more components, such as the processor 802, the memory 804, the COT sharing module 808, the transceiver 810, the modem 812, and the one or more antennas 816, to execute aspects of method 600.

At action 602, the UE 115*a* may transmit an SL-BSR to the network unit 105. In this regard, the UE 115*a* may transmit the SL-BSR to the network unit 105 via uplink control information (UCI), a physical uplink control channel (PUCCH), a physical uplink shared channel (PUSCH), a MAC CE on a PUSCH, or other suitable communication. The SL-BSR associated with the UE 115*a* may include a COT initiating request (e.g., cot_initiate=1 or cot_sharing=0) associated with the UE 115*a*. The COT initiating request may indicate to the network unit 105 that the UE 115*a* requests a COT indicator that configures the UE 115*a* to initiate a COT and share the COT with sidelink UE 115*b*, sidelink UE 115*c*, and/or share the COT with other UEs. The SL-BSR associated with the UE 115*a* may include a location associated with the UE 115*a*, a latency (e.g., a packet delay budget (PDB) or remaining PDB) associated with data of the UE 115*a*, and/or a priority or reliability associated with data of the UE 115*a*.

At action 604, the UE 115*b* may transmit a SL-BSR to the network unit 105. In this regard, the UE 115*b* may transmit the SL-BSR to the network unit 105 via UCI, MAC CE, or other suitable communication. The SL-BSR associated with the UE 115*b* may include a COT sharing request associated with the UE 115*b*. The COT sharing request (e.g., cot_initiate=0 or cot_sharing=1) may indicate to the network unit 105 that the UE 115*b* requests a COT indicator that configures the UE 115*b* to share the COT with sidelink UE 115*a*, sidelink UE 115*c*, and/or share the COT with other UEs. The SL-BSR associated with the UE 115*b* may include a location associated with the UE 115*b*, a latency (e.g., PDB or remaining PDB) associated with data of the UE 115*b*, and/or a priority or reliability associated with data of the UE 115*b*.

At action 606, the UE 115*c* may transmit a SL-BSR to the network unit 105. In this regard, the UE 115*c* may transmit the SL-BSR to the network unit 105 via UCI, MAC CE, or other suitable communication. The SL-BSR associated with the UE 115*c* may include a COT sharing request (e.g., cot_initiate=0 or cot_sharing=1) associated with the UE 115*c*. The COT sharing request may indicate to the network unit 105 that the UE 115*c* requests a COT indicator that configures the UE 115*c* to share the COT with sidelink UE 115*a*, sidelink UE 115*b*, and/or share the COT with other UEs. The SL-BSR associated with the UE 115*c* may include a location associated with the UE 115*c*, a latency (e.g., a PDB or remaining PDB) associated with data of the UE 115*c*, and/or a priority or reliability associated with data of the UE 115*c*.

At action 608 the network unit 105 may determine a COT ID, a COT duration, a COT initiator UE, and/or COT sharing UEs based on the SL-BSRs received at actions 602, 604, and/or 606. In some aspects, the network unit 105 determines multiple COT IDs and/or the associated durations, multiple COT initiating UEs (e.g., COT initiating UEs conducting LBTs at different LBT sub-bands at the same or different times, or conducting different directional LBT using different spatial filter at the same or different LBT sub-bands and at the same or different times) to initiate the multiple COTs, and the COT sharing UEs to share the multiple COTs respectively.

At action 610, the network unit 105 may transmit a COT indicator to the UE 115*a* indicating the UE 115*a* as a COT initiating UE (e.g., cot_initiate=1 or cot_sharing=0).

At action 612, the network unit 105 may transmit a COT indicator to the UE 115*b* indicating the UE 115*b* as a COT sharing UE (e.g., cot_initiate=0 or cot_sharing=1).

At action 614, the network unit 105 may transmit a COT indicator to the UE 115*c* indicating the UE 115*c* as a COT sharing UE (e.g., cot_initiate=0 or cot_sharing=1).

At action 616, the COT initiating UE 115*a* may perform a successful LBT procedure or other clear channel assessment (CCA) on one or more sidelink communication channels based on receiving the COT indicator at action 610. The COT initiating UE 115*a* may perform an LBT procedure or other CCA to gain access to the channel and initiate a COT in an unlicensed (e.g., shared) frequency spectrum. For example, the COT initiating UE 115*a* may perform a full LBT (e.g., a CAT 4 LBT) to gain access to the channel and initiate a COT in an unlicensed frequency spectrum. In some aspects, the COT initiating UE 115*a* may perform the LBT in one or more LBT sub-bands (e.g., 20 MHz for LBT). The one or more LBT sub-bands may include subchannels, and/or resource blocks (RBs). In some aspects, the COT initiating UE 115*a* may perform the LBT for one or more directional beams (e.g., a beam in the direction of the UE that the COT initiating UE 115*a* intends to transmit a communication to. The starting point of the COT may be based on the COT initiating UE 115*a* performing a first successful LBT.

At action 618, the COT initiating UE 115*a* may transmit an initial COT indication to the COT sharing UE 115*b*. The initial COT indication may indicate to the COT sharing UE 115*b* the start of the COT based on the first successful LBT performed by the COT initiating UE 115*a* at action 616.

At action 620, the COT initiating UE 115*a* may transmit an initial COT indication to the COT sharing UE 115*c*. The initial COT indication may indicate to the COT sharing UE 115*c* the start of the COT based on the first successful LBT performed by the COT initiating UE 115*a* at action 616.

At action 622, the COT sharing UE 115*b* may perform a successful LBT to gain access to the channel and to share the COT. The COT sharing UE 115*b* may perform a reduced category LBT (e.g., a CAT 2 LBT) in the resources allocated to the COT sharing UE 115*b* referenced to the start of the COT.

At action 624, the COT sharing UE 115*b* may transmit a transport block to the UE 115*c*. If the reduced category LBT is successful at action 622, then the COT sharing UE 115*b* may transmit one or more communications (e.g., one or more TBs) in the allocated resources to UE 115*c*.

Figure 7:
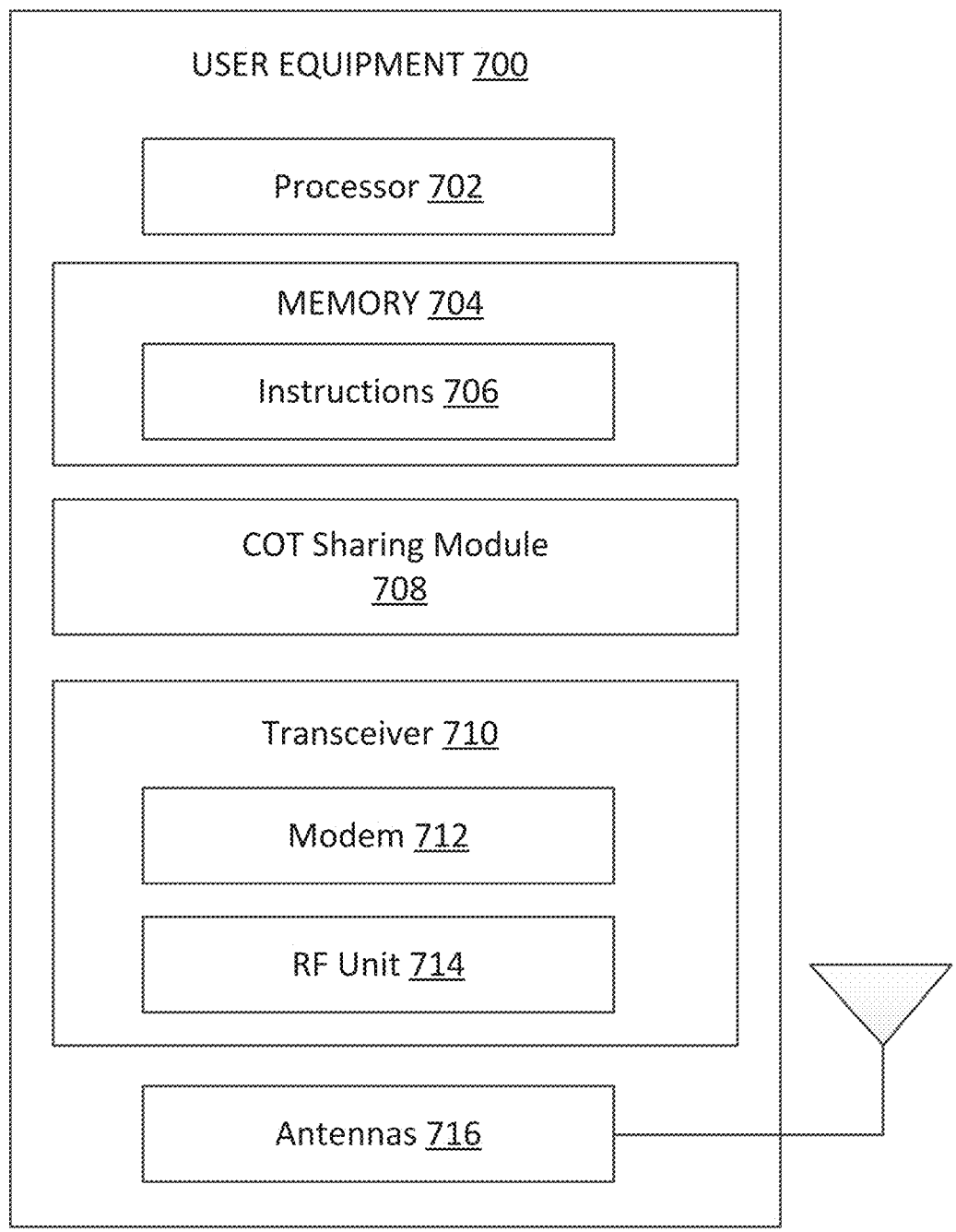
FIG. 7 is a block diagram of an exemplary user equipment (UE) according to some aspects of the present disclosure.

FIG. 7 is a block diagram of an exemplary UE 700 according to some aspects of the present disclosure. The UE 700 may be the UE 115 or the UE 120 in the network 100 or 1200 as discussed above. As shown, the UE 700 may include a processor 702, a memory 704, a COT sharing module 708, a transceiver 710 including a modem subsystem 712 and a radio frequency (RF) unit 714, and one or more antennas 716. These elements may be coupled with each other and in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 704 includes a non-transitory computer-readable medium. The memory 704 may store instructions 706. The instructions 706 may include instructions that, when executed by the processor 702, cause the processor 702 to perform the operations described herein with reference to the UEs 115 in connection with aspects of the present disclosure, for example, aspects of FIGS. 3-6. Instructions 706 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The COT sharing module 708 may be implemented via hardware, software, or combinations thereof. For example, the COT sharing module 708 may be implemented as a processor, circuit, and/or instructions 706 stored in the memory 704 and executed by the processor 702. In some aspects, the COT sharing module 708 may be used to transmit, to a network unit (e.g., the BS 105, the RU 1240, the DU 1230, the CU 1210, or the network unit 800), an indication associated with channel occupancy time (COT) sharing on sidelink communication. The COT sharing module 708 may receive, from the network unit, a COT indicator, wherein the COT indicator indicates to the first UE to initiate a COT on sidelink communication based on the indication associated with the COT sharing or the COT indicator indicates to the first UE to share the COT on sidelink communication based on the indication associated with the COT sharing on sidelink communication. The COT sharing module 708 may transmit, to a second UE, a communication during the COT on sidelink communication.

As shown, the transceiver 710 may include the modem subsystem 712 and the RF unit 714. The transceiver 710 can be configured to communicate bi-directionally with other devices, such as the BSs 105 and/or the UEs 115. The modem subsystem 712 may be configured to modulate and/or encode the data from the memory 704 and the according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together to enable the UE 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The antennas 716 may include multiple antennas of similar or different designs in order to sustain multiple transmission links. The RF unit 714 may configure the antennas 716.

In some instances, the UE 700 can include multiple transceivers 710 implementing different RATs (e.g., NR and LTE). In some instances, the UE 700 can include a single transceiver 710 implementing multiple RATs (e.g., NR and LTE). In some instances, the transceiver 710 can include various components, where different combinations of components can implement RATs.

Figure 8:
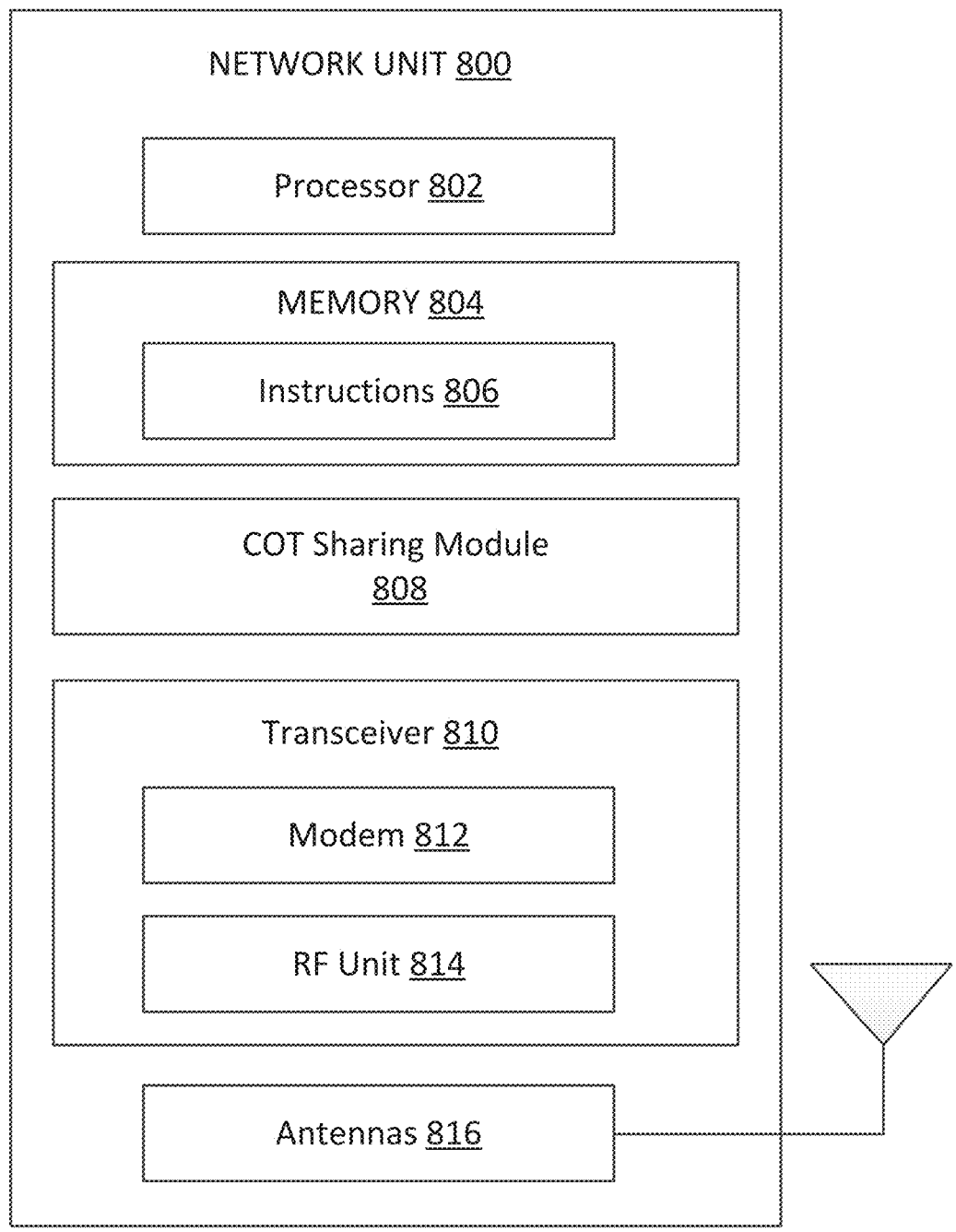
FIG. 8 is a block diagram of an exemplary network unit according to some aspects of the present disclosure.

FIG. 8 is a block diagram of an exemplary network unit 800 according to some aspects of the present disclosure. The network unit 800 may be a BS 105, the CU 1210, the DU 1230, or the RU 1240, as discussed above. As shown, the network unit 800 may include a processor 802, a memory 804, a COT sharing module 808, a transceiver 810 including a modem subsystem 812 and a RF unit 814, and one or more antennas 816. These elements may be coupled with each other and in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 3-6. Instructions 806 may also be referred to as code, which may be interpreted broadly to include any type of computer-readable statement(s).

The COT sharing module 808 may be implemented via hardware, software, or combinations thereof. For example, the COT sharing module 808 may be implemented as a processor, circuit, and/or instructions 806 stored in the memory 804 and executed by the processor 802.

In some aspects, the COT sharing module 808 may implement the aspects of FIGS. 3-6. For example, the COT sharing module 808 may receive, from a first UE (e.g., the UE 115, the UE 120, or the UE 700), a first indication associated with channel occupancy time (COT) sharing on sidelink communication. The COT sharing module 808 may receive, from a second UE (e.g., the UE 115, the UE 120, or the UE 700), a second indication associated with the COT sharing on sidelink communication. The COT sharing module 808 may transmit, to the first UE based on the first indication and the second indication, an indicator to initiate the COT on sidelink communication. The COT sharing module 808 may transmit, to the second UE based on the first indication and the second indication, an indicator to share the COT on sidelink communication.

Additionally or alternatively, the COT sharing module 808 can be implemented in any combination of hardware and software, and may, in some implementations, involve, for example, processor 802, memory 804, instructions 806, transceiver 810, and/or modem 812.

As shown, the transceiver 810 may include the modem subsystem 812 and the RF unit 814. The transceiver 810 can be configured to communicate bi-directionally with other devices, such as the UEs 115 and/or 600. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115 or UE 700. The RF unit 814 may be further configured to perform analog beamforming in conjunction with the digital beamforming. Although shown as integrated together in transceiver 810, the modem subsystem 812 and/or the RF unit 814 may be separate devices that are coupled together at the network unit 800 to enable the network unit 800 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, a configuration indicating a plurality of sub-slots within a slot according to aspects of the present disclosure. The antennas 816 may further receive data messages transmitted from other devices and provide the received data messages for processing and/or demodulation at the transceiver 810. The antennas 816 may include multiple antennas of similar or different designs in order to sustain multiple transmission links.

In some instances, the network unit 800 can include multiple transceivers 810 implementing different RATs (e.g., NR and LTE). In some instances, the network unit 800 can include a single transceiver 810 implementing multiple RATs (e.g., NR and LTE). In some instances, the transceiver 810 can include various components, where different combinations of components can implement RATs.

Figure 9:
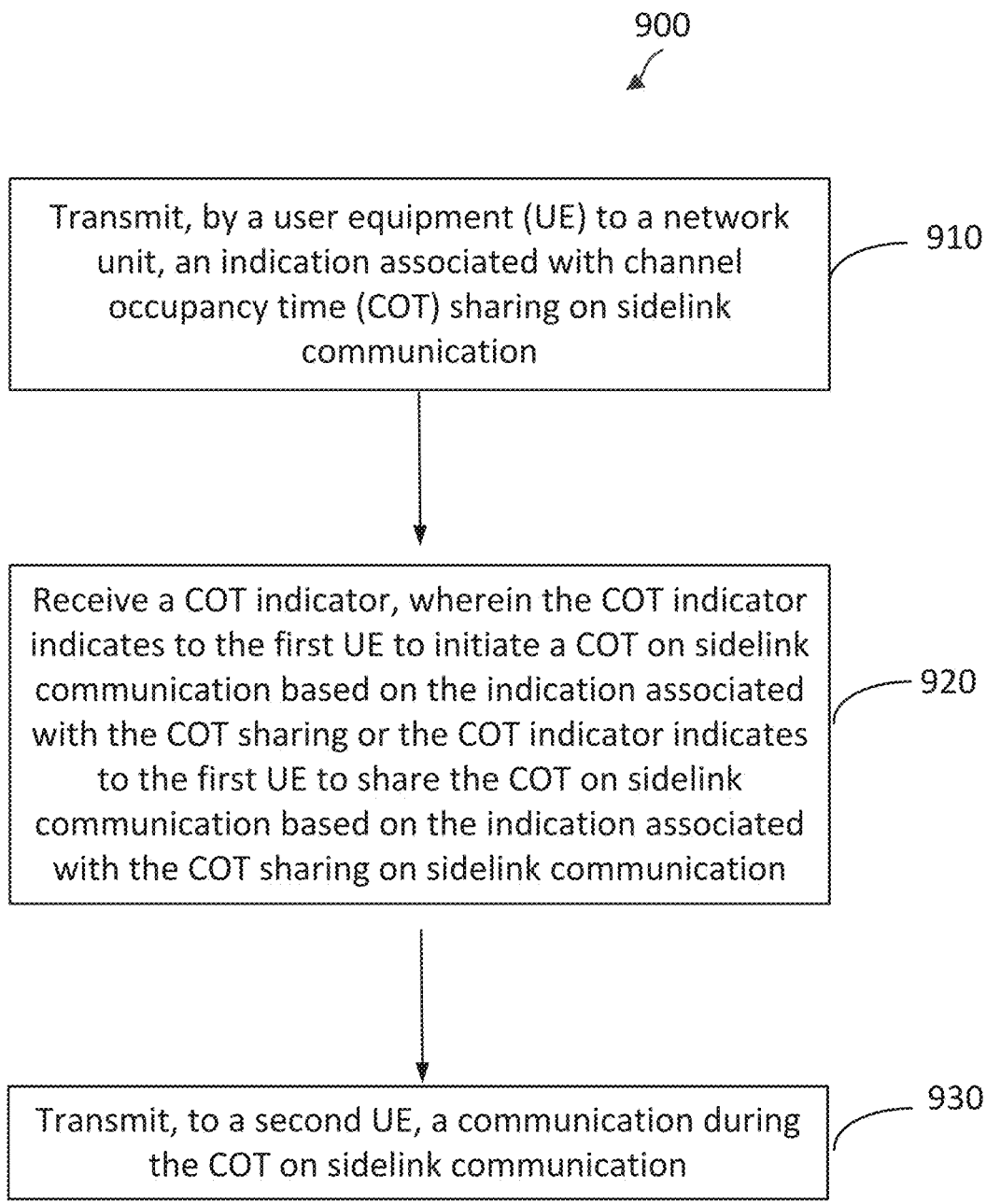
FIG. 9 is a flow diagram of a communication method according to some aspects of the present disclosure.

FIG. 9 is a flow diagram of a communication method 900 according to some aspects of the present disclosure. Aspects of the method 900 can be executed by a computing device (e.g., a processor, processing circuit, and/or other suitable component) of a wireless communication device or other suitable means for performing the aspects. For example, a wireless communication device, such as the UE 115, the UE 120, or the UE 700, may utilize one or more components, such as the processor 702, the memory 704, the COT sharing module 708, the transceiver 710, the modem 712, and the one or more antennas 716, to execute aspects of method 900. The method 900 may employ similar mechanisms as in the networks 100 and 1200 and the aspects and actions described with respect to FIGS. 3-6. As illustrated, the method 900 includes a number of enumerated aspects, but the method 900 may include additional aspects before, after, and in between the enumerated aspects. In some aspects, one or more of the enumerated aspects may be omitted or performed in a different order.

At action 910, the method 900 includes a first UE (e.g., the UE 115, the UE 120, or the UE 700) transmitting, to a network unit, an indication associated with channel occupancy time (COT) sharing on sidelink communication. In this regard, the first UE may transmit the indication to the network unit via uplink control information (UCI), a physical uplink control channel (PUCCH) message, a physical uplink shared channel (PUSCH) message, or other suitable communication. In some aspects, the indication associated with the COT sharing on sidelink communication may include a sidelink buffer status report (SL-BSR) associated with the first UE. The SL-BSR associated with the first UE may include a COT initiating request associated with the first UE. The COT initiating request may indicate to the network unit that the first UE requests a COT indicator that configures the first UE to initiate a COT and share the COT with a second UE (e.g., a sidelink UE such as the UE 115, the UE 120, or the UE 700) and/or share the COT with other UEs. In some aspects, multiple UEs may transmit requests to the network unit requesting to initiate a COT or share a COT. The network unit may determine which UEs will initiate a COT and which UEs will share a COT as described in greater detail herein. In some aspects, a sidelink communication may have a relatively small data size (e.g., less than 3824 bits, less than 1024 bits, less than 512 bits), and thus may not require all resources in the shared frequency band (e.g., an unlicensed frequency band) and/or the entire COT duration. Accordingly, COT sharing UEs may share the COT with the COT initiating UE and utilize any remaining resources after the first UE transmits within the COT. The COT initiating UE may transmit a COT start indicator to the COT sharing UEs after a successful LBT. Mechanisms for sidelink COT sharing are described in greater detail herein.

In some aspects, the SL-BSR associated with the first UE may include a COT sharing request associated with the first UE. The COT sharing request may indicate to the network unit that the first UE requests a COT indicator that configures the first UE to share the COT with a second UE (e.g., a sidelink UE that has been designated as a COT initiating UE).

In some aspects, the SL-BSR associated with the first UE may include a location associated with the first UE. The location (e.g., a zone identity, a beam coverage pattern, a cell sector, a latitude/longitude range, a geofence) associated with the first UE may be used by the network unit to determine aspects of COT sharing for the first UE and one or more other UEs. For example, the location of the first UE may indicate a potential level of interference (e.g., radio frequency interference) between the first UE and one or more other UEs. The network unit may use the potential level of interference to determine aspects of COT sharing for the first UE. The network unit may determine COT sharing parameters associated with the first UE based on the location of the first UE. For example, the network unit may determine whether the first UE may be configured as a COT initiating UE and/or a COT sharing UE based on the location of the first UE and/or a location of one or more other UEs in proximity to the first UE. Additionally or alternatively, the network unit may determine a COT identifier and/or a COT duration based on the location of the first UE and/or a location of one or more other UEs in proximity to the first UE. In some aspects, the first UE may determine its location based on GPS coordinates, radio frequency triangulation, or other suitable method. Additionally or alternatively, the first UE may determines its location based on a zone identity associated with the first UE. In this regard, the first UE may determine its zone identity based on 3GPP TS 38.331, section 5.8.11 or other standard specification.

In some aspects, the SL-BSR associated with the first UE may include a packet delay budget associated with data of the first UE. The packet delay budget may be a maximum time delay associated with transmission of a transport block by the first UE. A time delay sensitive TB may have a packet delay budget in which the TB needs to be received based on the context or application. For example, a time delay sensitive TB may be transmitted by an industrial Internet of things (IoTs) device (e.g., a meter, a programmable logic controller, a sensor, a robot, an actuator, etc.) and/or a vehicle-to-everything (V2X) device. The IoT and/or V2X devices may communicate data in TBs that are time delay sensitive and/or requires high reliability (e.g., ultra-reliable low latency communications (URLLCs) or other time sensitive and/or high priority communications). For example, a UE such as sensor of a robot may need to transmit sensor data to a controller in real time or approximately real time. As another example, a vehicle may need to transmit safety related data to another vehicle in real time or approximately real time. The packet budget delay may be indicated as a number of milliseconds, a number of slots, a number of sub-slots, a number of symbols, or other time based metric.

In some aspects, the SL-BSR associated with the first UE may include a priority associated with data of the first UE (e.g., one or more TB(s) of the first UE). The priority associated with the data of the first UE may be indicated as a priority class. The priority class may be based on a context, a service, and/or an application associated with the TB. Example services having different priority levels may include, without limitation, conversational voice, video streaming, V2X messages, mission critical data, background data, enhanced mobile broadband, remote control, discrete automation, etc. For example, a TB representing conversational voice data may have a higher priority than a TB representing a text message. The priority level may be indicated as a code point, a number, a QOS, or other suitable indicator.

At action 920, the method 900 includes the first UE (e.g., the UE 115, the UE 120, or the UE 700) receiving a COT indicator. In this regard, the first UE may receive the COT indicator from a network unit via downlink control information (DCI), a radio resource control (RRC) message, a physical downlink control channel (PDCCH) message, a physical downlink shared channel (PDSCH) message, or other suitable communication. In some aspects, the COT indicator may indicate to the first UE to initiate a COT and/or share a COT. When the first UE is indicated as a COT initiator, the first UE may perform a listen-before-talk (LBT) procedure or other clear channel assessment (CCA) on one or more sidelink communication channels based on receiving the COT indicator. The COT initiating UE may perform an LBT procedure or other CCA to gain access to the COT in an unlicensed (e.g., shared) frequency spectrum. For example, the COT initiating UE may perform a category 2 LBT, a category 3 LBT, and/or a category 4 LBT to gain access to the COT in an unlicensed frequency spectrum. In some aspects, the COT initiating UE may perform the LBT in one or more frequency resources. The frequency resources may include a frequency spectrum, a frequency band, a frequency sub-band, a frequency subchannel, resource elements, resource blocks, and/or a frequency interlace (e.g., for meeting minimum OCB requirement). In some aspects, the COT initiating UE may perform the LBT for one or more directional beams (e.g., a beam in the direction of the UE that the COT initiating UE intends to transmit a communication to).

In some aspects, the COT indicator may indicate a resource allocation (e.g., time resources and/or frequency resources) to the first UE. The resource allocation may indicate resources that the first UE may use to transmit and/or retransmit communications. The resource allocation may indicate time resources including a COT duration, slots, sub-slots, and/or symbols. The frequency resources may include a frequency spectrum, a frequency band, a frequency sub-band, a frequency subchannel, resource elements, resource blocks, and/or a frequency interlace (e.g., for meeting minimum OCB requirement). When the first UE is indicated as a COT initiating UE, the resource allocation may be based on a time interval (e.g., a relative time interval) between when the network unit transmits the resource allocation (e.g., via DCI) to the COT initiating UE and the resource allocation. The COT initiating UE may start a COT at one of the allocated resources after a successful LBT. When the COT indicator indicates that the first UE is a COT sharing UE, the resource allocation may be based on a relative time interval from when the COT initiating UE gains the COT.

In some aspects, the starting point of the COT may be based on the COT initiating UE performing a successful LBT. For example, the COT initiating UE may receive a COT indicator from the network unit allocating resources to the COT initiating UE in slot (i), slot (j), and slot (k). Slot (i), slot (j), and slot (k) may be contiguous or non-contiguous in time. The COT initiating UE may perform an LBT before slot (i) in order to gain access to the COT during slot (i). If the LBT is unsuccessful, then the COT initiating UE may wait a period of time (e.g., a backoff time period) to perform another LBT. For example, the COT initiating UE may wait until an offset from the next slot boundary between slot (i)

and slot (j) to perform another LBT. If the subsequent LBT is successful, then the COT initiating UE may gain the COT starting at slot (j).

In some aspects, the COT indicator may indicate a COT identifier. In some aspects, the COT initiating UE may receive a COT indicator from the network unit indicating multiple COT identifiers. The COT identifier(s) may identify one or more COTs that the COT initiating UE may initiate and share with COT sharing UEs. The COT initiating UE may transmit the COT identifier(s) to the COT sharing UEs via sidelink communications (e.g., via SCI-1, SCI-2, an RRC message, a PSCCH message, a PSCCH message, or other suitable communication). The COT identifier may identify a COT that may be shared among sidelink UEs in proximity to one another. For example, a first UE, a second UE, and a third UE may transmit an indication associated with COT sharing to a network unit. The indicators may indicate the locations (e.g., zone identity) of each of the first, second, and third UEs. In response to receiving the indicators, the network unit may determine that the first, second, and third UEs have a common zone identity. The network unit may transmit the COT identifier to the COT initiating UE (e.g., the first UE). The network unit may transmit the UE identifiers of COT sharing UEs with a common zone identity to the COT initiating UE. The COT initiating UE may transmit the COT identifier to sidelink UEs requesting COT sharing that have a common zone identity. The COT initiating UE (e.g., the first UE) may transmit the COT identifier to the second UE and the third UE indicating the COT identifier via sidelink communications (e.g., via SCI-1, SCI-2, an RRC message, a PSCCH message, a PSCCH message, or other suitable communication) after a successful LBT.

In some aspects, the COT indicator may indicate a COT duration. The COT duration may indicate a time period that the COT initiating UE and the COT sharing UE(s) may transmit in. In some aspects, the COT duration may be based on an amount of data (e.g., TBs) the COT initiating UE and the COT sharing UE(s) needs to transmit. A larger amount of data may require a longer COT duration as compared to a smaller amount of data. The amount of data to be transmitted by the COT initiating UE and the COT sharing UE(s) may be indicated to the network unit in the SL-BSR. The COT duration may be indicated to the COT initiating UE and the COT sharing UE(s) as a number of slots, a number of sub-slots, a number of symbols, a number of milliseconds, or a combination thereof. In some aspects, the COT initiating UE may receive the COT duration from the network unit. The COT initiating UE may then transmit the COT duration to the COT sharing UEs via sidelink communications (e.g., via SCI-1, SCI-2, an RRC message, a PSCCH message, a PSCCH message, or other suitable communication) after a successful LBT. In some aspects, the COT duration may be a fixed time duration. In some aspects, the COT duration may be a variable time duration. For example, the COT initiating UE and/or the COT sharing UE(s) may extend the COT duration beyond an initial COT duration based on an updated SL-BSR associated with the COT initiating UE and/or the COT sharing UE(s). The COT initiating UE and/or the COT sharing UE(s) may transmit the updated SL-BSR to the network unit indicating the COT extension (e.g., extension by a number of slots). In response, the network unit may refrain from allocating resources in the number of slots indicated in the COT extension.

Additionally or alternatively, the COT indicator received from the network unit may indicate to the COT sharing UE to share the COT with the COT initiating UE. The COT indicator may be based on the COT sharing request transmitted by the COT sharing UE to the network unit at action 910. The COT sharing UE may receive the COT indicator from the COT initiating UE after the COT initiating UE performs a successful LBT. The COT sharing UE may receive the COT indicator from the COT initiating UE via sidelink communications (e.g., via SCI-1, SCI-2, an RRC message, a PSCCH message, a PSCCH message, or other suitable communication).

In some aspects, the resource allocation (e.g., the time resources) may be indicated to the COT sharing UE(s) relative to the start (e.g., the beginning) of the COT. The starting point of the COT may be based on the COT initiating UE performing a successful LBT. For example, the COT initiating UE may receive resource allocation from the network unit allocating resources in slot (x), where x is the index of the starting slot of the COT. The COT sharing UE may receive a resource allocation from the network unit allocating resources in slot (x+1). The starting slot (x) of the COT may be the slot immediately following the successful LBT. Slot (x+1) may be contiguous to slot (x). By allocating contiguous time resources among the COT initiating UE and the COT sharing UE(s), the probability of maintaining the COT from being accessed by other devices may be increased as compared to allocating resources with time gaps during which other devices may gain access to the COT. The resource allocations may be based on the SL-BSRs transmitted by the COT sharing UE(s) to the network unit at action 910. In some aspects, the number of slots, sub-slots, symbols, and/or frequency channels allocated to the COT sharing UE(s) may be based on the amount of data (e.g., number of TB(s)) to be transmitted by the COT sharing UE(s). The allocated resources may be contiguous in time and/or frequency. In some aspects, the allocated resources may be multiplexed in time and/or frequency with resources allocated to other COT sharing UEs and/or the COT initiating UE.

In some aspects, the resource allocation may be based on the priority and/or packet delay budget associated with the TBs to be transmitted by the COT sharing UE(s). For example, a UE transmitting TB(s) having a short packet delay budget may be allocated resources earlier in time than a UE transmitting TB(s) having a longer packet delay budget. In some aspects, a UE having higher priority TB(s) to transmit may be allocated more resources than a UE having lower priority TB(s) to transmit.

At action 930, the method 900 includes a first UE transmitting a communication (e.g., one or more TBs) during the COT in sidelink communication. In this regard, the first UE may transmit a communication to a network unit via UCI, PUCCH, PUSCH, or other suitable communication. In some aspects, the first UE may transmit a communication to a sidelink UE via SCI-1, SCI-2, PSCCH, PSSCH, or other suitable communication.

When the first UE is a COT initiating UE (e.g., as indicated by the network unit at action 920), the COT initiating UE may perform an LBT prior to the resources allocated to the COT initiating UE in an effort to gain access to the resources. If the LBT is successful, then the COT initiating UE may transmit the communication (e.g., one or more TBs) during the COT to the network unit and/or the second UE.

If the LBT is unsuccessful, then the COT initiating UE may wait a period of time (e.g., backoff time period) to perform another LBT. For example, the COT initiating UE may wait until an offset from the next slot boundary, sub-slot boundary, or symbol boundary to perform another LBT. If the subsequent LBT is successful, then the COT initiating UE may gain the COT starting at the slot boundary, sub-slot boundary, or symbol boundary and may transmit the communication (e.g., one or more TBs) during the COT to the network unit and/or the second UE. The second UE may be a COT sharing UE or another UE.

When the first UE is a COT sharing UE, the COT sharing UE(s) may receive the COT indicator, at action 920, from the COT initiating UE via SCI after the COT initiating UE performs a successful LBT. The COT indicator may indicate the COT ID, the start of the COT, and/or the COT duration. The COT sharing UE(s) may perform a reduced category LBT (e.g., a CAT 2 LBT) in the resources allocated at action 920 to the COT sharing UE(s) referenced to the start of the COT. If the reduced category LBT is successful, then the COT sharing UE(s) may, at action 930, transmit one or more communications (e.g., one or more TBs) in their respective allocated resources.

Figure 10:
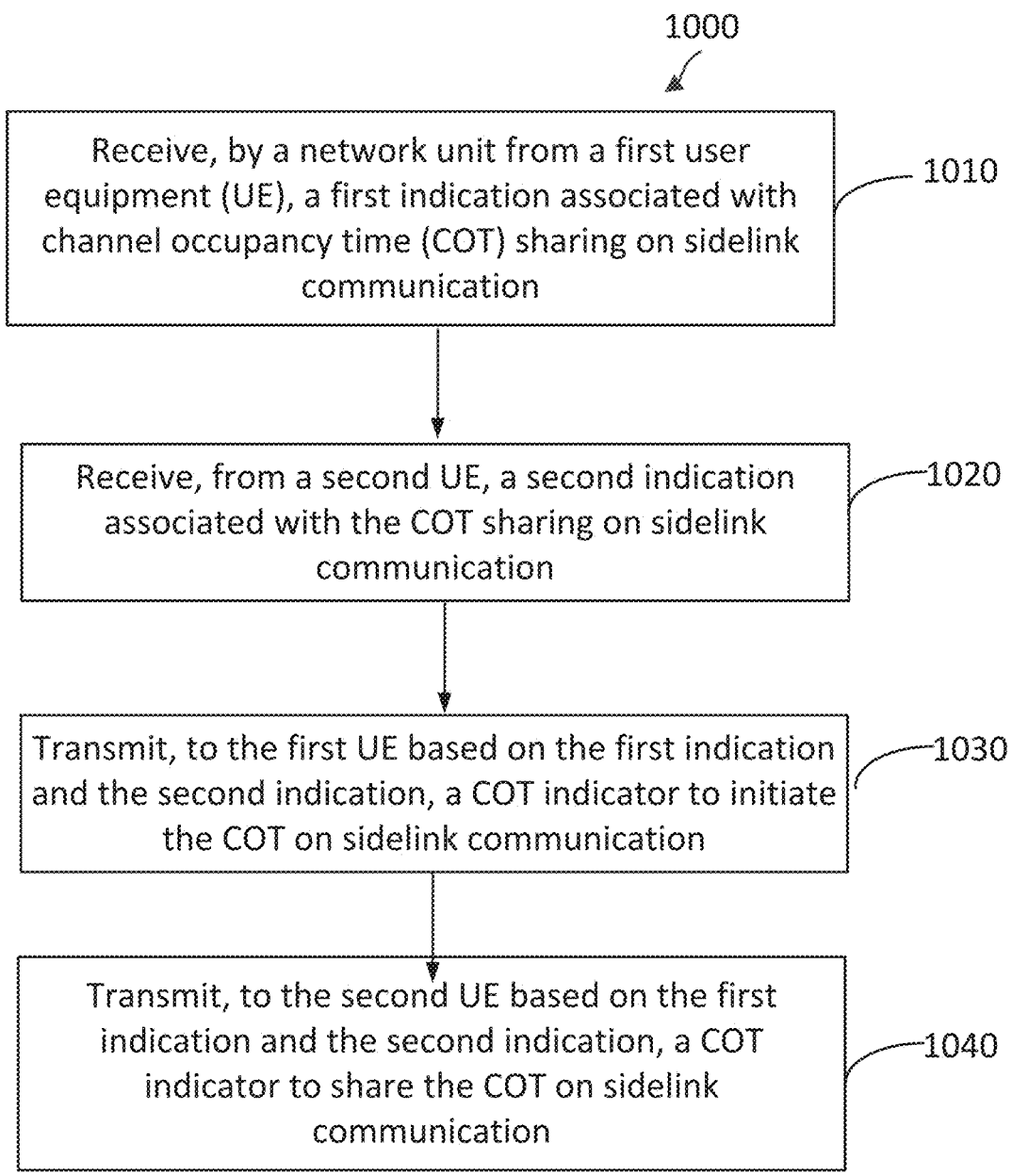
FIG. 10 is a flow diagram of a communication method according to some aspects of the present disclosure.

FIG. 10 is a flow diagram of a communication method 1000 according to some aspects of the present disclosure. Aspects of the method 1000 can be executed by a computing device (e.g., a processor, processing circuit, and/or other suitable component) of a wireless communication device or other suitable means for performing the aspects. For example, a wireless communication device, such as the BS 105, the RU 1240, the DU 1230, the CU 1210, or the network unit 800, may utilize one or more components, such as the processor 802, the memory 804, the COT sharing module 808, the transceiver 810, the modem 812, and the one or more antennas 816, to execute aspects of method 1000. The method 1000 may employ similar mechanisms as in the networks 100 and 1200 and the aspects and actions described with respect to FIGS. 3-6. As illustrated, the method 1000 includes a number of enumerated aspects, but the method 1000 may include additional aspects before, after, and in between the enumerated aspects. In some aspects, one or more of the enumerated aspects may be omitted or performed in a different order.

At action 1010, the method 1000 includes a network unit (e.g., the UE 115, the UE 120, or the UE 700) receiving, from a first user equipment (UE), a first indication associated with channel occupancy time (COT) sharing on sidelink communication. In this regard, the network unit may receive the indication from the first UE via uplink control information (UCI), a physical uplink control channel (PUCCH) message, a physical uplink shared channel (PUSCH) message, or other suitable communication.

At action 1020, the method 1000 includes a network unit (e.g., the UE 115, the UE 120, or the UE 700) receiving, from a second user equipment (UE), a second indication associated with channel occupancy time (COT) sharing on sidelink communication. In this regard, the network unit may receive the indication from the second UE via uplink control information (UCI), a physical uplink control channel (PUCCH) message, a physical uplink shared channel (PUSCH) message, or other suitable communication. In some aspects, the network unit may receive multiple indications associated with COT sharing from multiple UEs.

In some aspects, the indication (e.g., the first indication and/or the second indication) associated with the COT sharing on sidelink communication may include a sidelink buffer status report (SL-BSR) associated with the UE (e.g., the first UE, the second UE, and/or other UEs). The SL-BSR associated with the UE may include a COT initiating request associated with the UE. The COT initiating request may indicate to the network unit that the UE requests a COT indicator that configures the UE to initiate a COT and share the COT with other UE(s) (e.g., sidelink UE such as the UE 115, the UE 120, or the UE 700) or share the COT with the COT initiating UE. In some aspects, multiple UEs may transmit requests to the network unit requesting to initiate a COT or share a COT. The network unit may determine which UEs will initiate a COT and which UEs will share a COT as described in greater detail herein. In some aspects, a sidelink communication may have a relatively small data size (e.g., less than 3824 bits, less than 1024 bits, less than 512 bits), and thus may not require all resources in the shared frequency band (e.g., an unlicensed frequency band) and/or the entire COT duration. Accordingly, COT sharing UEs may share the COT with the COT initiating UE and utilize any remaining resources after the first UE transmits within the COT. The COT initiating UE may transmit a COT start indicator to the COT sharing UEs after a successful LBT. Mechanisms for sidelink COT sharing are described in greater detail herein.

In some aspects, the SL-BSR associated with the UE (e.g., the first UE, the second UE and/or other UEs) may include a COT sharing request associated with the UE. The COT sharing request may indicate to the network unit that the UE requests a COT indicator from the network unit that configures the UE to share the COT with a COT initiating UE (e.g., a sidelink UE that has been designated as a COT initiating UE).

In some aspects, the SL-BSR associated with the UE may include a location associated with the UE. The location (e.g., a zone identity, a beam coverage pattern, a cell sector, a latitude/longitude range, a geofence) associated with the UE may be used by the network unit to determine aspects of COT sharing for the UE and one or more other UEs. For example, the location of the UE may indicate a potential level of interference (e.g., radio frequency interference) between the UE and one or more other UEs. The network unit may use the potential level of interference to determine aspects of COT sharing for the UEs. The network unit may determine COT sharing parameters associated with the UE based on the location of the UE. For example, the network unit may determine whether the UE may be configured as a COT initiating UE and/or a COT sharing UE based on the location of the UE and/or a location of one or more other UEs in proximity to the UE. Additionally or alternatively, the network unit may determine a COT identifier and/or a COT duration based on the location of the UE and/or a location of one or more other UEs in proximity to the UE. In some aspects, the UE may determine its location based on GPS coordinates, radio frequency triangulation, or other suitable method. Additionally or alternatively, the UE may determines its location based on a zone identity associated with the UE. In this regard, the UE may determine its zone identity based on 3GPP TS 38.331, section 5.8.11 or other standard specification.

In some aspects, the SL-BSR associated with the UE may include a packet delay budget associated with data of the UE. The packet delay budget may be a maximum time delay associated with transmission of a transport block by the UE. A time delay sensitive TB may have a packet delay budget in which the TB needs to be received based on the context or application. For example, a time delay sensitive TB may be transmitted by an industrial Internet of things (IoTs) device (e.g., a meter, a programmable logic controller, a sensor, a robot, an actuator, etc.) and/or a vehicle-to-everything (V2X) device. The IoT and/or V2X devices may communicate data in TBs that are time delay sensitive and/or requires high reliability (e.g., ultra-reliable low latency communications (URLLCs) or other time sensitive and/or high priority communications). For example, a UE such as sensor of a robot may need to transmit sensor data to a controller in real time or approximately real time. As another example, a vehicle may need to transmit safety related data to another vehicle in real time or approximately real time. The packet budget delay may be indicated as a number of milliseconds, a number of slots, a number of sub-slots, a number of symbols, or other time based metric.

In some aspects, the SL-BSR associated with the UE may include a priority associated with data of the UE (e.g., one or more TB(s) of the UE). The priority associated with the data of the UE may be indicated as a priority class. The priority class may be based on a context, a service, and/or an application associated with the TB. Example services having different priority levels may include, without limitation, conversational voice, video streaming, V2X messages, mission critical data, background data, enhanced mobile broadband, remote control, discrete automation, etc. For example, a TB representing conversational voice data may have a higher priority than a TB representing a text message. The priority level may be indicated as a code point, a number, a QOS, or other suitable indicator.

At action 1030, the method 1000 includes the network unit (e.g., the BS 105, the RU 1240, the DU 1230, the CU 1210, or the network unit 800) transmitting, to the first UE based on the first indication and the second indication, an indicator to initiate the COT on sidelink communication. In this regard, the network unit may transmit the COT indicator to the first UE via downlink control information (DCI), a radio resource control (RRC) message, a physical downlink control channel (PDCCH) message, a physical downlink shared channel (PDSCH) message, or other suitable communication.

At action 1040, the method 1000 includes the network unit (e.g., the BS 105, the RU 1240, the DU 1230, the CU 1210, or the network unit 800) transmitting, to the second UE based on the first indication and the second indication, an indicator to share the COT on sidelink communication. In this regard, the network unit may transmit the COT indicator to the second UE via downlink control information (DCI), a radio resource control (RRC) message, a physical downlink control channel (PDCCH) message, a physical downlink shared channel (PDSCH) message, or other suitable communication.

When the first UE is indicated as a COT initiator, the first UE may perform a listen-before-talk (LBT) procedure or other clear channel assessment (CCA) on one or more sidelink communication channels based on receiving the COT indicator. The COT initiating UE may perform an LBT procedure or other CCA to gain access to the COT in an unlicensed (e.g., shared) frequency spectrum. For example, the COT initiating UE may perform a category 2 LBT, a category 3 LBT, and/or a category 4 LBT to gain access to the COT in an unlicensed frequency spectrum. In some aspects, the COT initiating UE may perform the LBT in one or more frequency resources. The frequency resources may include a frequency spectrum, a frequency band, a frequency sub-band, a frequency subchannel, resource elements, resource blocks, and/or a frequency interlace (e.g., for meeting minimum OCB requirement). In some aspects, the COT initiating UE may perform the LBT for one or more directional beams (e.g., a beam in the direction of the UE that the COT initiating UE intends to transmit a communication to).

In some aspects, the COT indicator may indicate a resource allocation (e.g., time resources and/or frequency resources) to the UE (e.g., the first UE and/or the second UE). The resource allocation may indicate resources that the UE may use to transmit and/or retransmit communications. The resource allocation may indicate time resources including a COT duration, slots, sub-slots, and/or symbols. The frequency resources may include a frequency spectrum, a frequency band, a frequency sub-band, a frequency subchannel, resource elements, resource blocks, and/or a frequency interlace (e.g., for meeting minimum OCB requirement). When the UE is indicated as a COT initiating UE, the resource allocation may be based on a time interval (e.g., a relative time interval) between when the network unit transmits the resource allocation (e.g., via DCI) to the COT initiating UE and the resource allocation. The COT initiating UE may start a COT at one of the allocated resources after a successful LBT. When the COT indicator indicates that the UE is a COT sharing UE, the resource allocation may be based on a relative time interval from when the COT initiating UE gains the COT.

In some aspects, the starting point of the COT may be based on the COT initiating UE performing a successful LBT. For example, the COT initiating UE may receive a COT indicator from the network unit allocating resources to the COT initiating UE in slot (i), slot (j), and slot (k). Slot (i), slot (j), and slot (k) may be contiguous or non-contiguous in time. The COT initiating UE may perform an LBT before slot (i) in order to gain access to the COT during slot (i). If the LBT is unsuccessful, then the COT initiating UE may wait a period of time (e.g., a backoff time period) to perform another LBT. For example, the COT initiating UE may wait until an offset from the next slot boundary between slot (i) and slot (j) to perform another LBT. If the subsequent LBT is successful, then the COT initiating UE may gain the COT starting at slot (j).

In some aspects, the COT indicator may indicate a COT identifier. In some aspects, the COT initiating UE may receive a COT indicator from the network unit indicating multiple COT identifiers. The COT identifier(s) may identify one or more COTs that the COT initiating UE may initiate and share with COT sharing UEs. The COT initiating UE may transmit the COT identifier(s) to the COT sharing UEs via sidelink communications (e.g., via SCI-1, SCI-2, an RRC message, a PSCCH message, a PSCCH message, or other suitable communication). The COT identifier may identify a COT that may be shared among sidelink UEs in proximity to one another. For example, a first UE, a second UE, and a third UE may transmit an indication associated with COT sharing to a network unit. The indicators may indicate the locations (e.g., zone identity) of each of the first, second, and third UEs. In response to receiving the indicators, the network unit may determine that the first, second, and third UEs have a common zone identity. The network unit may transmit the COT identifier to the COT initiating UE (e.g., the first UE). The network unit may transmit the UE identifiers of COT sharing UEs with a common zone identity to the COT initiating UE. The COT initiating UE may transmit the COT identifier to sidelink UEs requesting COT sharing that have a common zone identity. The COT initiating UE (e.g., the first UE) may transmit the COT identifier to the second UE and the third UE indicating the COT identifier via sidelink communications (e.g., via SCI-1, SCI-2, an RRC message, a PSCCH message, a PSCCH message, or other suitable communication) after a successful LBT.

In some aspects, the COT indicator may indicate a COT duration. The COT duration may indicate a time period that the COT initiating UE and the COT sharing UE(s) may transmit in. In some aspects, the COT duration may be based on an amount of data (e.g., TBs) the COT initiating UE and the COT sharing UE(s) needs to transmit. A larger amount of data may require a longer COT duration as compared to a smaller amount of data. The amount of data to be transmitted by the COT initiating UE and the COT sharing UE(s) may be indicated to the network unit in the SL-BSR. The COT duration may be indicated to the COT initiating UE and the COT sharing UE(s) as a number of slots, a number of sub-slots, a number of symbols, a number of milliseconds, or a combination thereof. In some aspects, the COT initiating UE may receive the COT duration from the network unit. The COT initiating UE may then transmit the COT duration to the COT sharing UEs via sidelink communications (e.g., via SCI-1, SCI-2, an RRC message, a PSCCH message, a PSCCH message, or other suitable communication) after a successful LBT.

Additionally or alternatively, the COT indicator received from the network unit may indicate to the COT sharing UE to share the COT with the COT initiating UE. The COT indicator may be based on the COT sharing request transmitted by the COT sharing UE to the network unit at action 1020. The COT sharing UE may receive the COT indicator from the network unit. In some aspect, the COT sharing UE may receive the COT indicator from the COT initiating UE after the COT initiating UE performs a successful LBT. The COT sharing UE may receive the COT indicator from the COT initiating UE via sidelink communications (e.g., via SCI-1, SCI-2, an RRC message, a PSCCH message, a PSCCH message, or other suitable communication.

In some aspects, the resource allocation (e.g., the time resources) may be indicated to the COT sharing UE(s) relative to the start (e.g., the beginning) of the COT. The starting point of the COT may be based on the COT initiating UE performing a successful LBT. For example, the COT initiating UE may receive resource allocation from the network unit allocating resources in slot (x), where x is the index of the starting slot of the COT. The COT sharing UE may receive a resource allocation from the network unit allocating resources in slot (x+1). The starting slot (x) of the COT may be the slot immediately following the successful LBT. Slot (x+1) may be contiguous to slot (x). By allocating contiguous time resources among the COT initiating UE and the COT sharing UE(s), the probability of maintaining the COT from being accessed by other devices may be increased as compared to allocating resources with time gaps during which other devices main gain access to the COT. The resource allocations may be based on the SL-BSRs transmitted by the COT sharing UE(s) to the network unit. In some aspects, the number of slots, sub-slots, symbols, and/or frequency channels allocated to the COT sharing UE(s) may be based on the amount of data (e.g., number of TB(s)) to be transmitted by the COT sharing UE(s). The allocated resources may be contiguous in time and/or frequency. In some aspects, the allocated resources may be multiplexed in time and/or frequency with resources allocated to other COT sharing UEs and/or the COT initiating UE.

In some aspects, the resource allocation may be based on the priority and/or packet delay budget associated with the TBs to be transmitted by the COT sharing UE(s). For example, a UE transmitting TB(s) having a short packet delay budget may be allocated resources earlier in time than a UE transmitting TB(s) having a longer packet delay budget. In some aspects, a UE having higher priority TB(s) to transmit may be allocated more resources than a UE having lower priority TB(s) to transmit.

In some aspects, the first UE may transmit a communication (e.g., one or more TBs) during the COT in sidelink communication. In this regard, the first UE may transmit a communication to a network unit via UCI, PUCCH, PUSCH, or other suitable communication. In some aspects, the first UE may transmit a communication to a sidelink UE via SCI-1, SCI-2, PSCCH, PSSCH, or other suitable communication.

When the first UE is a COT initiating UE (e.g., as indicated by the network unit at action 1030), the COT initiating UE may perform an LBT prior to the resources allocated to the COT initiating UE in an effort to gain access to the resources. If the LBT is successful, then the COT initiating UE may transmit the communication (e.g., one or more TBs) during the COT to the network unit and/or the second UE.

If the LBT is unsuccessful, then the COT initiating UE may wait a period of time (e.g., backoff time period) to perform another LBT. For example, the COT initiating UE may wait until an offset from the next slot boundary, sub-slot boundary, or symbol boundary to perform another LBT. If the subsequent LBT is successful, then the COT initiating UE may gain the COT starting at the slot boundary, sub-slot boundary, or symbol boundary and may transmit the communication (e.g., one or more TBs) during the COT to the network unit, the second UE, and/or another UE.

When the second UE is a COT sharing UE (e.g., as indicated by the network unit at action 1040), the COT sharing UE(s) may receive the COT indicator from the COT initiating UE via SCI after the COT initiating UE performs a successful LBT. The COT indicator may indicate the COT ID, the start of the COT, and/or the COT duration. The COT sharing UE(s) may perform a reduced category LBT (e.g., a CAT 2 LBT) in the resources allocated to the COT sharing UE(s) referenced to the start of the COT. If the reduced category LBT is successful, then the COT sharing UE(s) may transmit communications (e.g., one or more TBs) in their respective allocated resources.

Further aspects of the present disclosure include the following:

Aspect 1 includes a method of wireless communication performed by a first user equipment (UE), the method comprising transmitting, to a network unit, an indication associated with channel occupancy time (COT) sharing on sidelink communication; receiving, from the network unit, a COT indicator, wherein the COT indicator indicates to the first UE to initiate a COT on sidelink communication based on the indication associated with the COT sharing or the COT indicator indicates to the first UE to share the COT on sidelink communication based on the indication associated with the COT sharing on sidelink communication; and transmitting, to a second UE, a communication during the COT on sidelink communication.

Aspect 2 includes the method of aspect 1, wherein the indication associated with the COT sharing on sidelink communication comprises at least a sidelink buffer status report (SL-BSR) associated with the first UE including at least one of a COT initiating request associated with the first UE; a COT sharing request associated with the first UE; a location associated with the first UE; a packet delay budget associated with the first UE's data; or a priority associated with the first UE's data.

Aspect 3 includes the method of any of aspects 1-2, wherein the receiving the COT indicator comprises receiving a sidelink resource allocation and the COT indicator via downlink control information (DCI).

Aspect 4 includes the method of any of aspects 1-3, wherein the COT indicator indicates to the first UE to initiate the COT on sidelink communication; and further comprising performing a listen-before-talk (LBT) procedure on sidelink communication based on the receiving the COT indicator, wherein the transmitting the communication during the COT on sidelink communication comprises transmitting the communication during the COT based on the LBT procedure being successful.

Aspect 5 includes the method of any of aspects 1-4, further comprising receiving, from the network unit, one or more sidelink transmission resources, wherein a start of the COT is based on a first transmission with LBT procedure being successful at the one or more sidelink transmission resources.

Aspect 6 includes the method of any of aspects 1-5, wherein the COT indicator indicates to the first UE to initiate the COT on sidelink communication; and further comprising receiving, a COT identifier; and transmitting, to a third UE on sidelink communication, the COT identifier.

Aspect 7 includes the method of any of aspects 1-6, wherein the COT indicator indicates to the first UE to initiate the COT on sidelink communication; and further comprising receiving, from the network unit, a COT duration; and transmitting, to a third UE on sidelink communication, the COT duration.

Aspect 8 includes the method of any of aspects 1-7, wherein the COT indicator indicates to the first UE to share the COT on sidelink communication; and further comprising receiving, from the network unit, at least one sidelink transmission resource, wherein the sidelink transmission resource is relative to a beginning of the COT on sidelink communication associated with a COT identifier.

Aspect 9 includes the method of any of aspects 1-8, further comprising receiving, from a third UE on sidelink communication, at least the COT identifier; and transmitting, to a fourth UE on sidelink communication, based at least in part on the COT identifier.

Aspect 10 includes a method of wireless communication performed by a network unit, the method comprising receiving, from a first user equipment (UE), a first indication associated with channel occupancy time (COT) sharing on sidelink communication; receiving, from a second UE, a second indication associated with the COT sharing on sidelink communication; transmitting, to the first UE based on the first indication and the second indication, an indicator to initiate the COT on sidelink communication; and transmitting, to the second UE based on the first indication and the second indication, an indicator to share the COT on sidelink communication.

Aspect 11 includes the method of aspect 10, wherein the transmitting, to the first UE, the indicator to initiate the COT on sidelink communication comprises transmitting a first sidelink resource allocation and the indicator to initiate the COT on sidelink communication via a first downlink control information (DCI); and the transmitting, to the second UE, the indicator to share the COT on sidelink communication comprises transmitting a second sidelink resource allocation and the indicator to share the COT on sidelink communication via a second DCI.

Aspect 12 includes the method of any of aspects 10-11, wherein the first indication associated with the COT sharing on sidelink communication comprises at least a sidelink buffer status report (SL-BSR) associated with the first UE including at least one of a COT initiating request associated with the first UE; a location associated with the first UE; a packet delay budget associated with the first UE's data; or a priority associated with the first UE's data; and the second indication associated with the COT sharing on sidelink communication comprises at least an SL-BSR associated with the second UE including at least one of a COT sharing request associated with the second UE; a location associated with the second UE; a packet delay budget associated with the second UE's data; or a priority associated with the second UE's data.

Aspect 13 includes the method of any of aspects 10-12, further comprising transmitting, to the first UE, a COT identifier; and transmitting, to the first UE, a COT duration based at least in part on a number of UEs within a proximity of the first UE.

Aspect 14 includes the method of any of aspects 10-13, wherein a beginning of the COT on sidelink communication is based on a first successful listen-before-talk (LBT) procedure associated with the first UE.

Aspect 15 includes the method of any of aspects 10-14, wherein the first indication associated with the COT sharing on sidelink communication comprises a sidelink buffer status report (SL-BSR) associated with the first UE; the second indication associated with the COT sharing on sidelink communication comprises an SL-BSR associated with the second UE; and further comprising transmitting, to the first UE, a first resource allocation based on the SL-BSR associated with the first UE; and transmitting, to the second UE, a second resource allocation based on the SL-BSR associated with the second UE.

Aspect 16 includes a non-transitory computer-readable medium storing one or more instructions for wireless communication, the one or more instructions comprising one or more instructions that, when executed by one or more processors of a first UE, cause the first UE to perform any one of aspects 1-9.

Aspect 17 includes a non-transitory computer-readable medium storing one or more instructions for wireless communication, the one or more instructions comprising one or more instructions that, when executed by one or more processors of a network unit cause the network unit to perform any one of aspects 10-15.

Aspect 18 includes a first user equipment (UE) comprising one or more means to perform any one or more of aspects 1-9.

Aspect 19 includes a network unit comprising one or more means to perform any one or more of aspects 10-15.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a first user equipment (UE), the method comprising:
    transmitting, to a network unit, an indication associated with channel occupancy time (COT) sharing on sidelink communication;
    receiving, from the network unit, a COT indicator, wherein the COT indicator indicates to the first UE to initiate a COT on sidelink communication based on the indication associated with the COT sharing or the COT indicator indicates to the first UE to share the COT on sidelink communication based on the indication associated with the COT sharing on sidelink communication; and
    transmitting, to a second UE, a communication during the COT on sidelink communication;
    wherein the indication associated with the COT sharing on sidelink communication comprises at least a sidelink buffer status report (SL-BSR) associated with the first UE including at least one of:
        a COT initiating request associated with the first UE;
        a COT sharing request associated with the first UE;
        a location associated with the first UE;
        a packet delay budget associated with the first UE's data; or
        a priority associated with the first UE's data.

2. The method of claim 1, wherein the receiving the COT indicator comprises receiving a sidelink resource allocation and the COT indicator via downlink control information (DCI).

3. The method of claim 1, wherein the COT indicator indicates to the first UE to initiate the COT on sidelink communication; and
    further comprising:
        performing a listen-before-talk (LBT) procedure on sidelink communication based on the receiving the COT indicator, wherein:
            the transmitting the communication during the COT on sidelink communication comprises transmitting the communication during the COT based on the LBT procedure being successful.

4. The method of claim 3, further comprising:
    receiving, from the network unit, one or more sidelink transmission resources, wherein a start of the COT is based on a first transmission with LBT procedure being successful at the one or more sidelink transmission resources.

5. A method of wireless communication performed by a first user equipment (UE), the method comprising:
    transmitting, to a network unit, an indication associated with channel occupancy time (COT) sharing on sidelink communication;
    receiving, from the network unit, a COT indicator, wherein the COT indicator indicates to the first UE to initiate a COT on sidelink communication based on the indication associated with the COT sharing or the COT indicator indicates to the first UE to share the COT on sidelink communication based on the indication associated with the COT sharing on sidelink communication, wherein the COT indicator indicates to the first UE to initiate the COT on sidelink communication;
    transmitting, to a second UE, a communication during the COT on sidelink communication;
    receiving, a COT identifier; and
    transmitting, to a third UE on sidelink communication, the COT identifier.

6. A method of wireless communication performed by a first user equipment (UE), the method comprising:
    transmitting, to a network unit, an indication associated with channel occupancy time (COT) sharing on sidelink communication;
    receiving, from the network unit, a COT indicator, wherein the COT indicator indicates to the first UE to initiate a COT on sidelink communication based on the indication associated with the COT sharing or the COT indicator indicates to the first UE to share the COT on sidelink communication based on the indication associated with the COT sharing on sidelink communication, wherein the COT indicator indicates to the first UE to initiate the COT on sidelink communication;
    receiving, from the network unit, a COT duration;
    transmitting, to a second UE, a communication during the COT on sidelink communication; and
    transmitting, to a third UE on sidelink communication, the COT duration.

7. The method of claim 1, wherein the COT indicator indicates to the first UE to share the COT on sidelink communication; and
    further comprising:
        receiving, from the network unit, at least one sidelink transmission resource, wherein the sidelink transmission resource is relative to a beginning of the COT on sidelink communication associated with a COT identifier.

8. The method of claim 7, further comprising:
    receiving, from a third UE on sidelink communication, at least the COT identifier; and
    transmitting, to a fourth UE on sidelink communication, based at least in part on the COT identifier.

9. A method of wireless communication performed by a network unit, the method comprising:
    receiving, from a first user equipment (UE), a first indication associated with channel occupancy time (COT) sharing on sidelink communication;

receiving, from a second UE, a second indication associated with the COT sharing on sidelink communication;
transmitting, to the first UE based on the first indication and the second indication, an indicator to initiate the COT on sidelink communication; and
transmitting, to the second UE based on the first indication and the second indication, an indicator to share the COT on sidelink communication;
wherein the first indication associated with the COT sharing on sidelink communication comprises at least a sidelink buffer status report (SL-BSR) associated with the first UE including at least one of:
a COT initiating request associated with the first UE;
a location associated with the first UE;
a packet delay budget associated with the first UE's data; or
a priority associated with the first UE's data; and
the second indication associated with the COT sharing on sidelink communication comprises at least an SL-BSR associated with the second UE including at least one of:
a COT sharing request associated with the second UE;
a location associated with the second UE;
a packet delay budget associated with the second UE's data; or
a priority associated with the second UE's data.

10. The method of claim 9, wherein:
the transmitting, to the first UE, the indicator to initiate the COT on sidelink communication comprises transmitting a first sidelink resource allocation and the indicator to initiate the COT on sidelink communication via a first downlink control information (DCI); and
the transmitting, to the second UE, the indicator to share the COT on sidelink communication comprises transmitting a second sidelink resource allocation and the indicator to share the COT on sidelink communication via a second DCI.

11. A method of wireless communication performed by a network unit, the method comprising:
receiving, from a first user equipment (UE), a first indication associated with channel occupancy time (COT) sharing on sidelink communication;
receiving, from a second UE, a second indication associated with the COT sharing on sidelink communication;
transmitting, to the first UE based on the first indication and the second indication, an indicator to initiate the COT on sidelink communication;
transmitting, to the second UE based on the first indication and the second indication, an indicator to share the COT on sidelink communication;
transmitting, to the first UE, a COT identifier; and
transmitting, to the first UE, a COT duration based at least in part on a number of UEs within a proximity of the first UE.

12. The method of claim 11, wherein a beginning of the COT on sidelink communication is based on a first successful listen-before-talk (LBT) procedure associated with the first UE.

13. A method of wireless communication performed by a network unit, the method comprising:
receiving, from a first user equipment (UE), a first indication associated with channel occupancy time (COT) sharing on sidelink communication, wherein the first indication associated with the COT sharing on sidelink communication comprises: a sidelink buffer status report (SL-BSR) associated with the first UE;
receiving, from a second UE, a second indication associated with the COT sharing on sidelink communication, wherein the second indication associated with the COT sharing on sidelink communication comprises: an SL-BSR associated with the second UE;
transmitting, to the first UE, a first resource allocation based on the SL-BSR associated with the first UE;
transmitting, to the second UE, a second resource allocation based on the SL-BSR associated with the second UE;
transmitting, to the first UE based on the first indication and the second indication, an indicator to initiate the COT on sidelink communication; and
transmitting, to the second UE based on the first indication and the second indication, an indicator to share the COT on sidelink communication.

14. A first user equipment (UE) comprising:
a memory;
a transceiver; and
at least one processor coupled to the memory and the transceiver, wherein the first UE is configured to:
transmit, to a network unit, an indication associated with channel occupancy time (COT) sharing on sidelink communication;
receive, from the network unit, a COT indicator, wherein the COT indicator indicates to the first UE to initiate a COT on sidelink communication based on the indication associated with the COT sharing or the COT indicator indicates to the first UE to share the COT on sidelink communication based on the indication associated with the COT sharing on sidelink communication; and
transmit, to a second UE, a communication during the COT on sidelink communication;
wherein the indication associated with the COT sharing on sidelink communication comprises at least a sidelink buffer status report (SL-BSR) associated with the first UE including at least one of:
a COT initiating request associated with the first UE;
a COT sharing request associated with the first UE;
a location associated with the first UE;
a packet delay budget associated with the first UE's data; or
a priority associated with the first UE's data.

15. The first UE of claim 14, wherein the first UE is further configured to:
receive a sidelink resource allocation and the COT indicator via downlink control information (DCI).

16. A first user equipment (UE) comprising:
a memory;
a transceiver; and
at least one processor coupled to the memory and the transceiver, wherein the first UE is configured to:
transmit, to a network unit, an indication associated with channel occupancy time (COT) sharing on sidelink communication;
receive, from the network unit, a COT indicator, wherein the COT indicator indicates to the first UE to initiate a COT on sidelink communication based on the indication associated with the COT sharing or the COT indicator indicates to the first UE to share the COT on sidelink communication based on the indication associated with the COT sharing on sidelink communication; and
transmit, to a second UE, a communication during the COT on sidelink communication;

wherein the COT indicator indicates to the first UE to initiate the COT on sidelink communication; and the first UE is further configured to:
perform a listen-before-talk (LBT) procedure on sidelink communication based on the receiving the COT indicator; and
transmit the communication during the COT based on the LBT procedure being successful.

17. The first UE of claim 16, the first UE is further configured to:
receive, from the network unit, one or more sidelink transmission resources, wherein a start of the COT is based on a first transmission with LBT procedure being successful at the one or more sidelink transmission resources.

18. The first UE of claim 14, wherein the COT indicator indicates to the first UE to initiate the COT on sidelink communication; and
the first UE is further configured to:
receive, a COT identifier; and
transmit, to a third UE on sidelink communication, the COT identifier.

19. A first user equipment (UE) comprising:
a memory;
a transceiver; and
at least one processor coupled to the memory and the transceiver, wherein the first UE is configured to:
transmit, to a network unit, an indication associated with channel occupancy time (COT) sharing on sidelink communication;
receive, from the network unit, a COT indicator, wherein the COT indicator indicates to the first UE to initiate a COT on sidelink communication based on the indication associated with the COT sharing or the COT indicator indicates to the first UE to share the COT on sidelink communication based on the indication associated with the COT sharing on sidelink communication, wherein the COT indicator indicates to the first UE to initiate the COT on sidelink communication;
receive, from the network unit, a COT duration;
transmit, to a second UE, a communication during the COT on sidelink communication;
transmit, to a third UE on sidelink communication, the COT duration.

20. The first UE of claim 14, wherein the COT indicator indicates to the first UE to share the COT on sidelink communication; and
the first UE is further configured to:
receive, from the network unit, at least one sidelink transmission resource, wherein the sidelink transmission resource is relative to a beginning of the COT on sidelink communication associated with a COT identifier.

21. The first UE of claim 20, wherein the first UE is further configured to:
receive, from a third UE on sidelink communication, at least the COT identifier; and
transmit, to a fourth UE on sidelink communication, based at least in part on the COT identifier.

22. A network unit comprising:
a memory;
a transceiver; and
at least one processor coupled to the memory and the transceiver, wherein the network unit is configured to:
receive, from a first user equipment (UE), a first indication associated with channel occupancy time (COT) sharing on sidelink communication;

receive, from a second UE, a second indication associated with the COT sharing on sidelink communication;
transmit, to the first UE based on the first indication and the second indication, an indicator to initiate the COT on sidelink communication; and
transmit, to the second UE based on the first indication and the second indication, an indicator to share the COT on sidelink communication;
wherein the first indication associated with the COT sharing on sidelink communication comprises at least a sidelink buffer status report (SL-BSR) associated with the first UE including at least one of:
a COT initiating request associated with the first UE;
a location associated with the first UE;
a packet delay budget associated with the first UE's data; or
a priority associated with the first UE's data; and
the second indication associated with the COT sharing on sidelink communication comprises at least an SL-BSR associated with the second UE including at least one of:
a COT sharing request associated with the second UE;
a location associated with the second UE;
a packet delay budget associated with the second UE's data; or
a priority associated with the second UE's data.

23. The network unit of claim 22, wherein the network unit is further configured to:
transmit a first sidelink resource allocation and the indicator to initiate the COT on sidelink communication via a first downlink control information (DCI); and
transmit a second sidelink resource allocation and the indicator to share the COT on sidelink communication via a second DCI.

24. A network unit comprising:
a memory;
a transceiver; and
at least one processor coupled to the memory and the transceiver, wherein the network unit is configured to:
receive, from a first user equipment (UE), a first indication associated with channel occupancy time (COT) sharing on sidelink communication;
receive, from a second UE, a second indication associated with the COT sharing on sidelink communication;
transmit, to the first UE based on the first indication and the second indication, an indicator to initiate the COT on sidelink communication; and
transmit, to the second UE based on the first indication and the second indication, an indicator to share the COT on sidelink communication,
transmit, to the first UE, a COT identifier; and
transmit, to the first UE, a COT duration based at least in part on a number of UEs within a proximity of the first UE.

25. The network unit of claim 24, wherein a beginning of the COT on sidelink communication is based on a first successful listen-before-talk (LBT) procedure associated with the first UE.

26. A network unit comprising:
a memory;
a transceiver; and
at least one processor coupled to the memory and the transceiver, wherein the network unit is configured to:
receive, from a first user equipment (UE), a first indication associated with channel occupancy time (COT) sharing on sidelink communication, wherein the first indication associated with the COT sharing on sidelink communication comprises a sidelink buffer status report (SL-BSR) associated with the first UE;

receive, from a second UE, a second indication associated with the COT sharing on sidelink communication, wherein the second indication associated with the COT sharing on sidelink communication comprises an SL-BSR associated with the second UE;

transmit, to the first UE based on the first indication and the second indication, an indicator to initiate the COT on sidelink communication; and transmit, to the second UE based on the first indication and the second indication, an indicator to share the COT on sidelink communication transmit, to the first UE, a first resource allocation based on the SL-BSR associated with the first UE; and transmit, to the second UE, a second resource allocation based on the SL-BSR associated with the second UE.

* * * * *